United States Patent
Montgomery et al.

(10) Patent No.: US 7,110,103 B2
(45) Date of Patent: Sep. 19, 2006

(54) APPARATUS FOR AND METHOD OF ALIGNING A STRUCTURE

(75) Inventors: David James Montgomery, Oxford (GB); Christopher Jones, Bromley (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/441,254

(22) Filed: May 19, 2003

(65) Prior Publication Data

US 2003/0227615 A1    Dec. 11, 2003

(30) Foreign Application Priority Data

May 21, 2002   (GB)   .................... 0211613.5

(51) Int. Cl.
*G01B 11/26* (2006.01)
*G01B 11/14* (2006.01)

(52) U.S. Cl. ............... 356/152.1; 356/152.2; 356/614; 356/622

(58) Field of Classification Search ............ 356/152.1, 356/152.2, 485, 488, 614, 620, 622, 305; 348/42, 190
See application file for complete search history.

(56) References Cited

U.S. PATENT DOCUMENTS

| | | | | |
|---|---|---|---|---|
| 3,796,497 A | * | 3/1974 | Mathisen et al. | 356/139.07 |
| 3,865,483 A | * | 2/1975 | Wojcik | 355/43 |
| 5,625,453 A | * | 4/1997 | Matsumoto et al. | 356/488 |
| 5,751,426 A | * | 5/1998 | Nose et al. | 356/488 |
| 2002/0080365 A1 | * | 6/2002 | Monshouwer et al. | 356/508 |

* cited by examiner

Primary Examiner—Thomas H. Tarcza
Assistant Examiner—Isam Alsomiri
(74) Attorney, Agent, or Firm—Renner, Otto, Boisselle & Sklar, LLP

(57) ABSTRACT

An apparatus for determining the orientation and/or position of a structure comprises a light source (28) for generating a light beam. A structure (31) is mounted in the optical path of the light beam such that the position and/or orientation of the structure, relative to the light beam, may be altered. The apparatus further comprises first capture means (32) for capturing a diffraction pattern produced by the first structure. Information about the alignment of the structure may be obtained from the diffraction pattern, and the position and/or orientation of the structure (31) relative to the light beam may be adjusted if necessary.

3 Claims, 22 Drawing Sheets

FIG 2
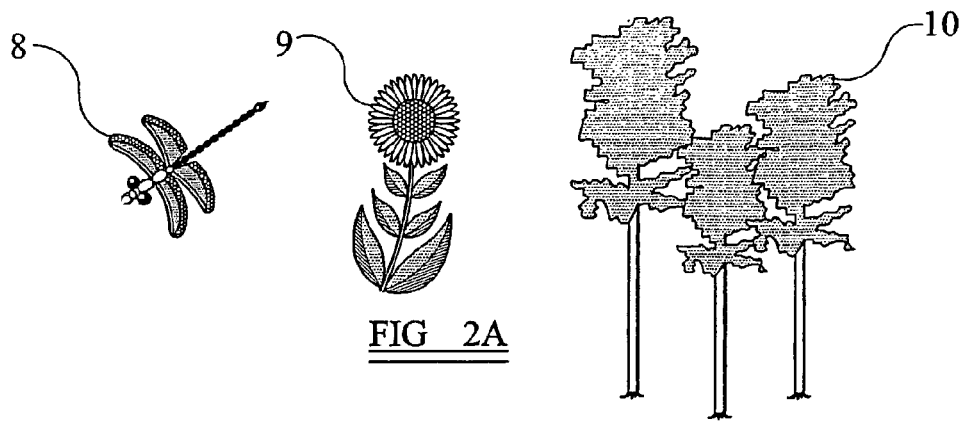
FIG 2A
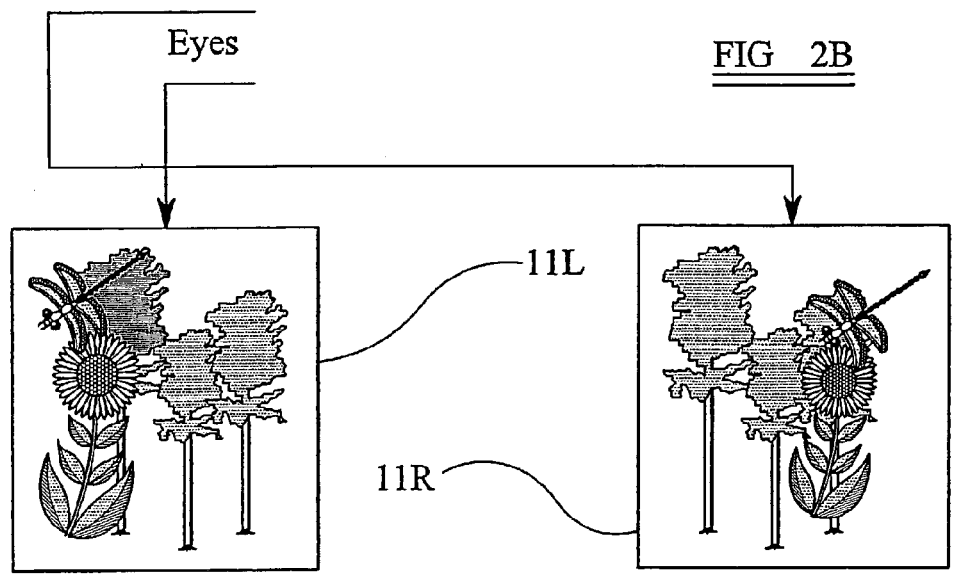
FIG 2B
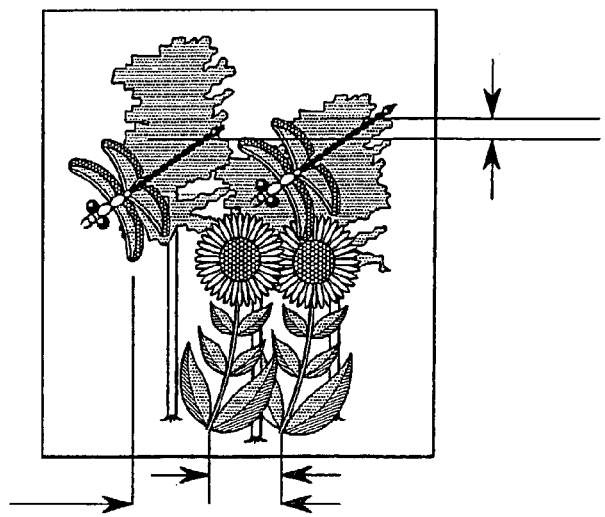
FIG 2C

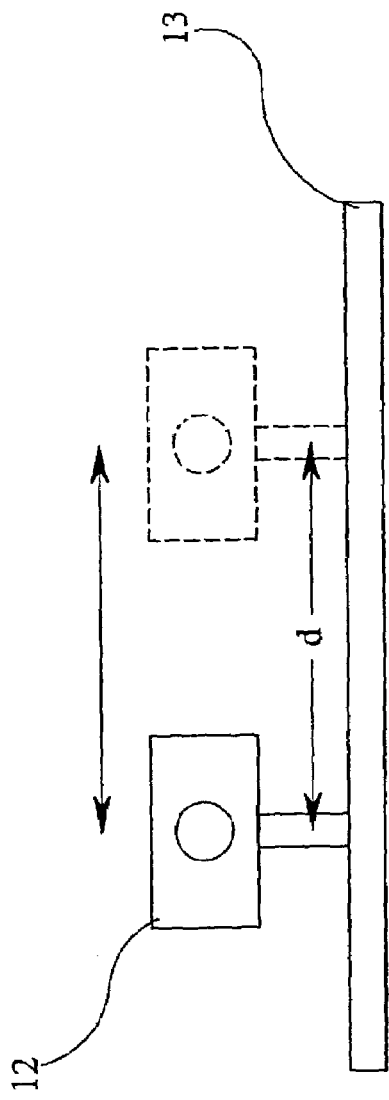
FIG. 3A(1)
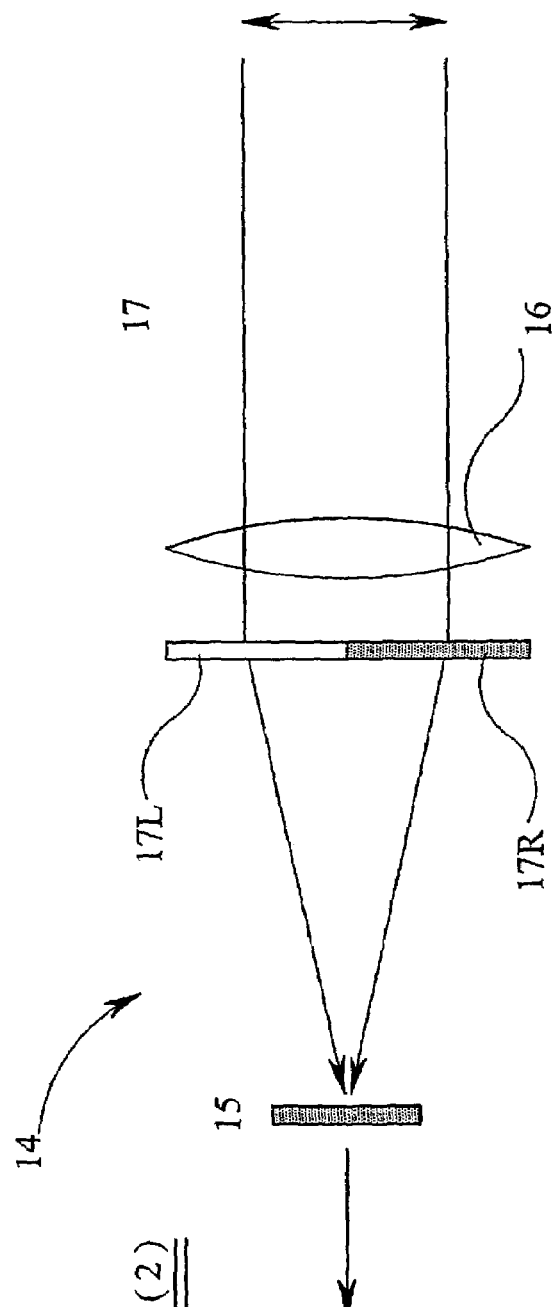
FIG. 3A(2)

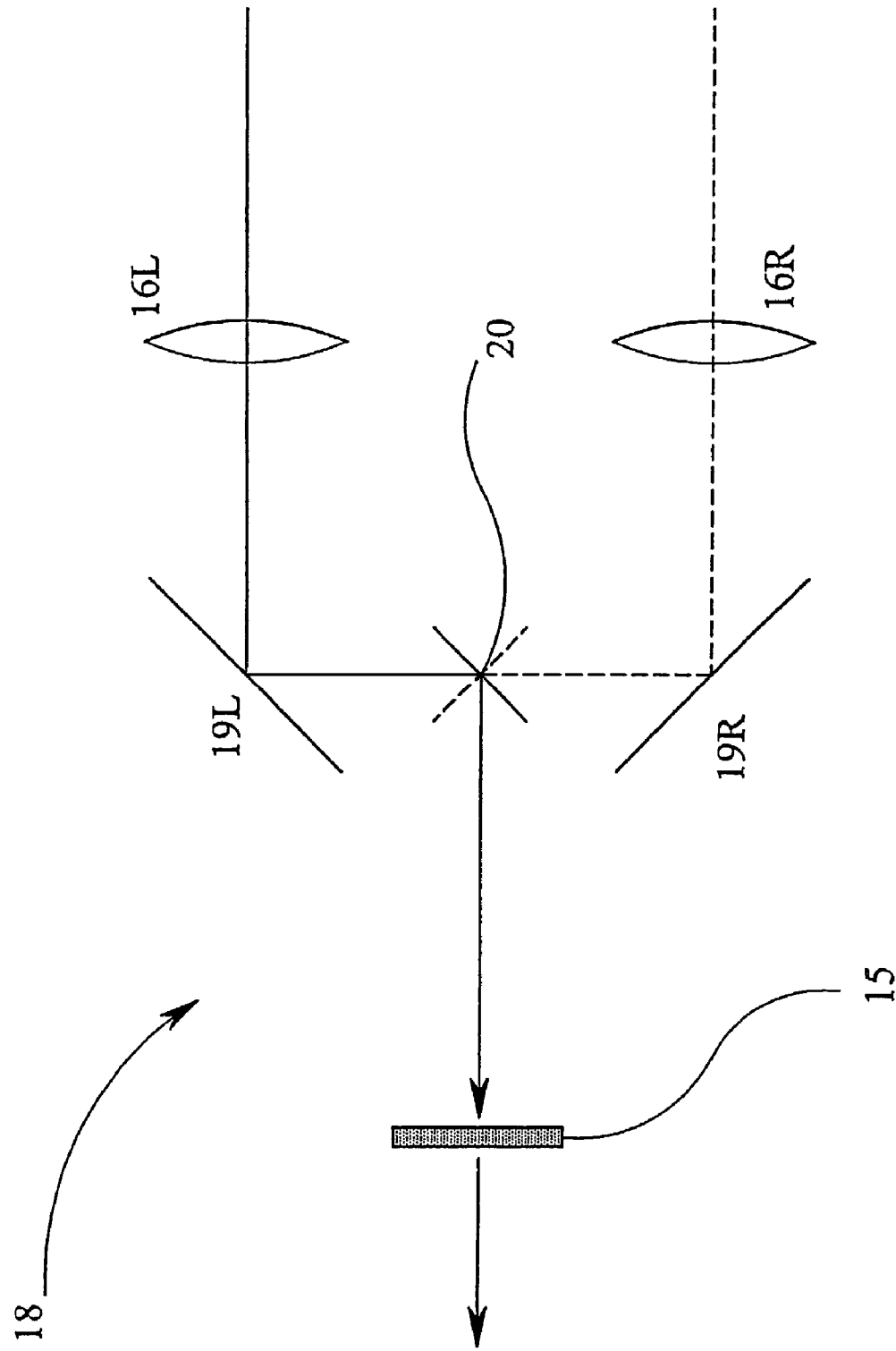

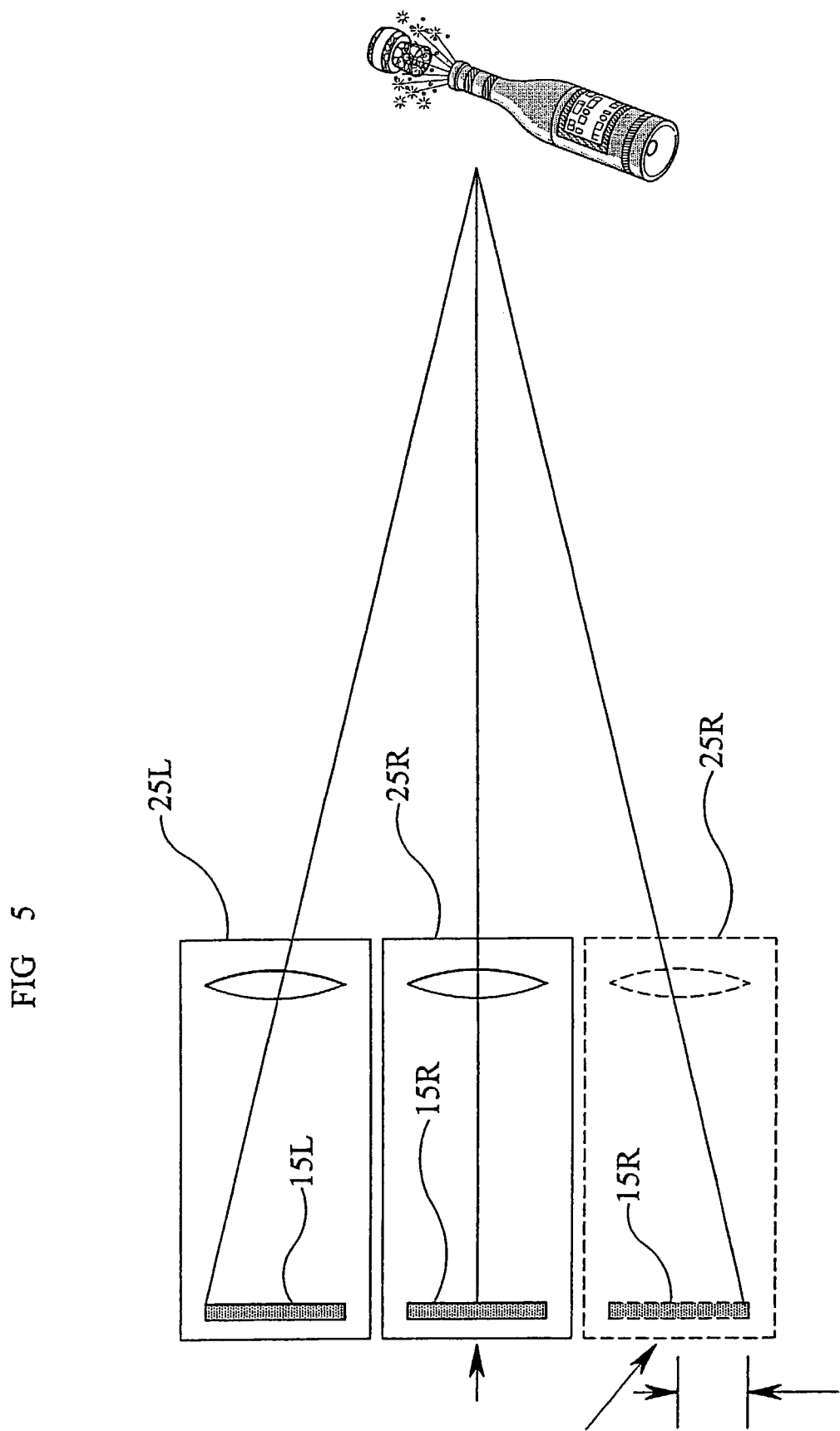

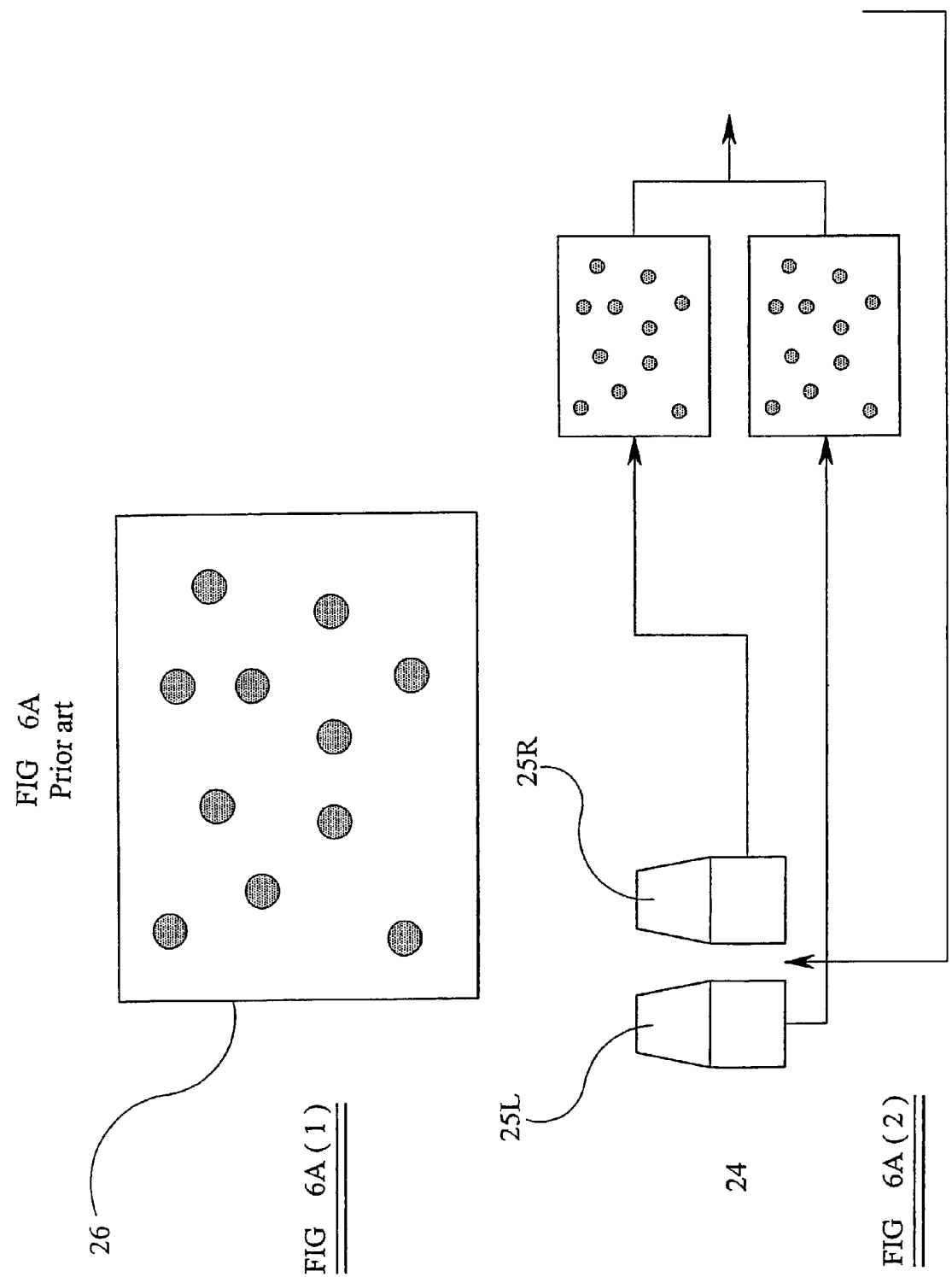

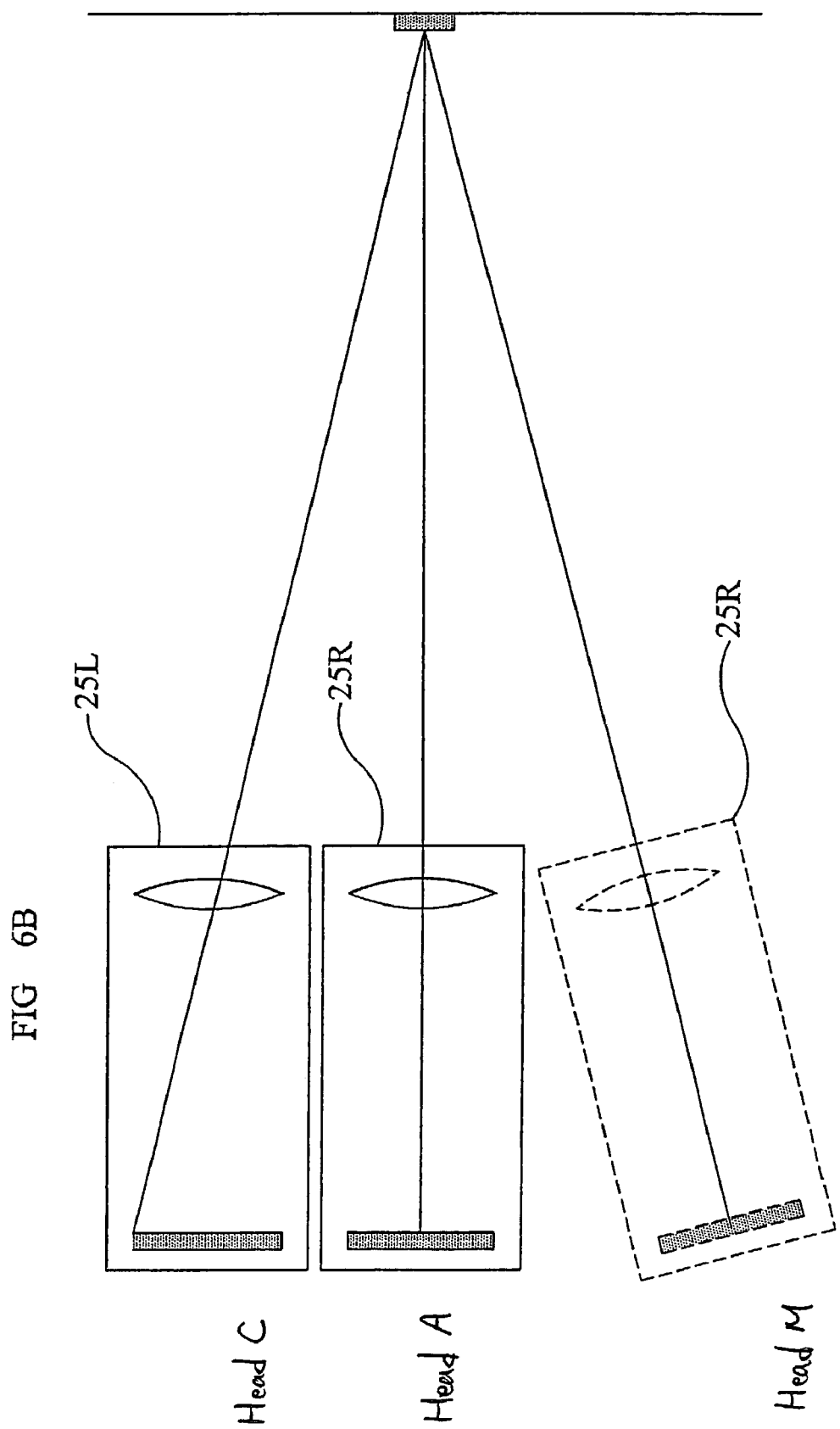

FIG 10B
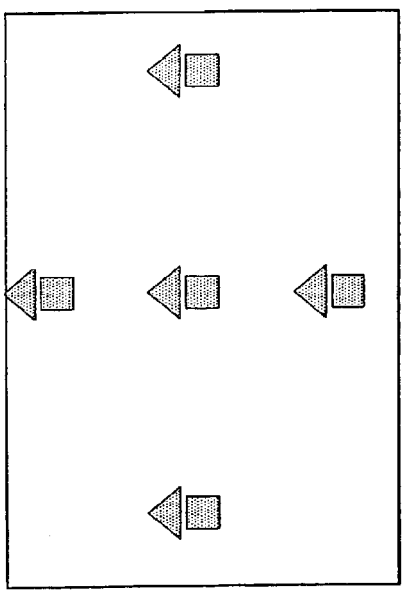
FIG 10B:(2)
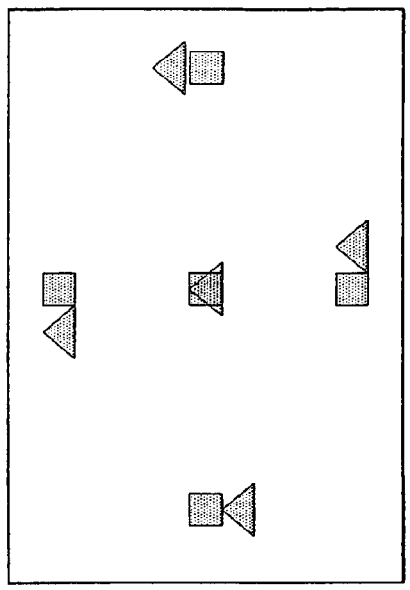
FIG 10B:(4)
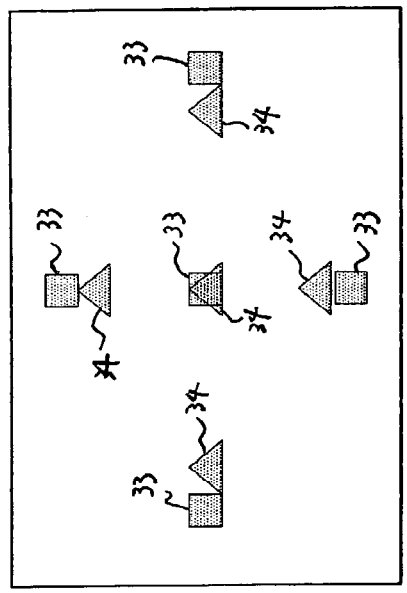
FIG 10B:(1)
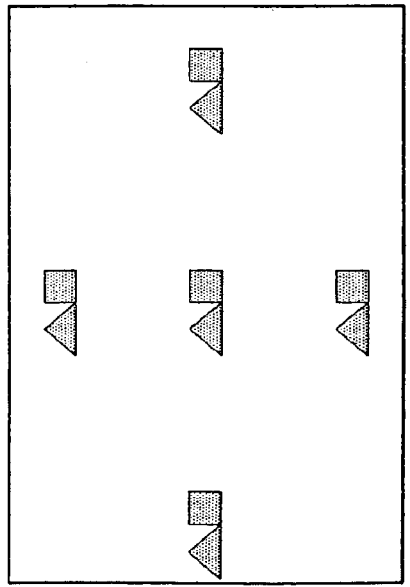
FIG 10B:(3)

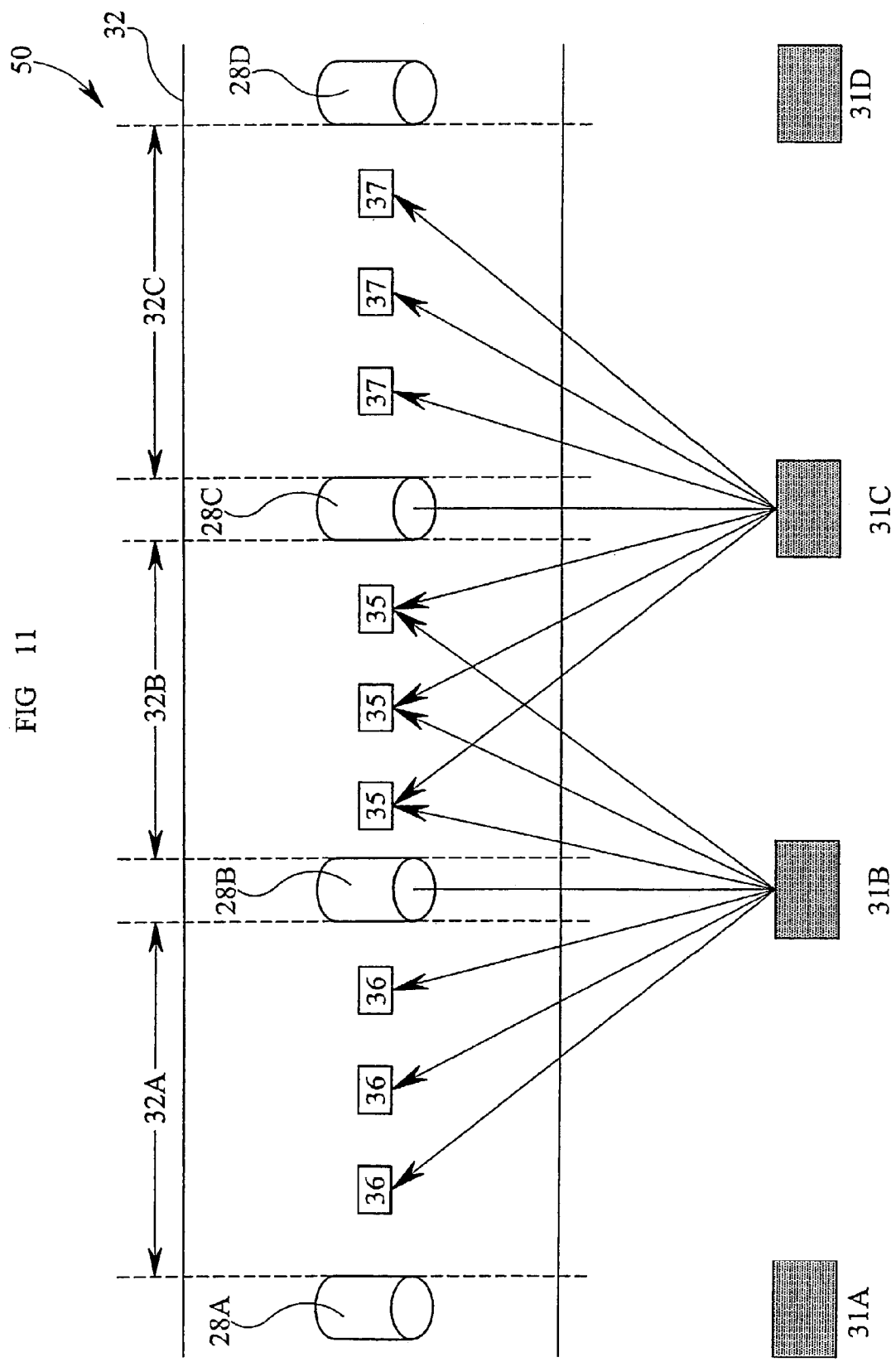

APPARATUS FOR AND METHOD OF ALIGNING A STRUCTURE

BACKGROUND OF THE INVENTION

1. Field of the Invention

The present invention relates to an apparatus for and method of determining the orientation and/or position of a structure that produces a diffraction pattern. In particular, the invention may be applied to an optical component that produces a diffraction pattern. Examples of applications of the invention include alignment of a sensor in a body for high-resolution photogrammetry, and alignment of optical elements or grating microstructures in an optical arrangement. In particular, the invention is applicable to the alignment of an optical component, such as a mirror or a detector, of a camera, and to the alignment of two camera bodies relative to one another to produce a stereoscopic camera pair.

2. Description of the Related Art

Human beings have two eyes which are placed side-by-side in the face with a lateral separation that varies from person to person with an average of around 65 mm. These eyes see the three-dimensional world from two slightly different points of view. When an object is close to an observer, the left eye sees the object from a different angle than does the right eye, and such objects appear shifted, relative to objects at a greater distance from the observer, when the views from each eye are compared. This shift is known as "parallax". The parallax is dependent on the distance of an object from the observer, so that the more distance is the object, the smaller is the shift or parallax. This behaviour is known as "binocular vision" and enables a person to judge the distance to an object and thus to assess the size of the object when no other cues (such as motion, memory or perspective) exist to judge the distance to an object. This ability to judge the distance to an object is called "stereopsis", which means "solid seeing".

The concept of stereopsis has been combined with photography to produce a three-dimensional camera. A single camera can produce a two-dimensional image, and the principle of three-dimensional photography is that two cameras are used, one to obtain the left eye image and one to obtain the right eye image. The two cameras are set up at a separation that is similar to the separation between the left eye and the right eye of a human being, so as to mimic the stereopsis effects. Each photograph mimics the image obtained by one eye, so that the two images include the parallax and shifts that are needed to judge distance by stereopsis. The two images are displayed to an observer such that the left-eye image is displayed to the observer's left eye and the right eye image is displayed to the observer's right eye.

An early three-dimensional projection system, known as a stereoscope, was popular in the 1850's. It used a system of lenses to display a separate image onto each eye of an observer. Since then, many methods of three-dimensional display have been proposed. Whatever the display method used, however, the quality of the three-dimensional image can only be as good as the two-dimensional images that are used to form it.

Two processes take place when the human eyes focus on an image. Firstly, the shape of the lens in each eye changes so as to alter the focal length to focus on an object. This process is known as "accommodation". The second process is that the angle between the axis of the two eye changes to ensure that the object is focused simultaneously on the fovea of each eye (the fovea is the most sensitive part of the retina of the eye). This process is known as "convergence".

FIG. 1A is a schematic illustration of a person looking at a distant object 3. The accommodation process will ensure that the lens in the left and right eyes 1L, 1R of the observer each change shape so as to focus on the object (assuming that the observer has normal vision). The convergence process will ensure that the point of convergence of the optical axis 2L of the left eye 1L with the optical axis 2R of the right eye 1R is coincident with the plane 4 containing the object 3.

FIG. 1B illustrates an observer looking at a closer object 5. The accommodation process ensures that the lens of each eye 1L, 1R changes shape so as to focus on the new image plane 6. The convergence process ensures that the point of convergence of the optic axes 2L, 2R of the two eyes alters so as to be coincident with the new image plane. The accommodation and convergence processes are not independent of one another, so that any mismatch between accommodation and convergence can lead to discomfort for the observer. This is a fundamental limitation of three-dimensional viewing.

The two different points of view of the two eyes of an observer produce images of objects on the retina that are different from one another. The difference depends on the distance of the object from the observer. The principle of a stereoscopic display is that the disparity between the image seen by the left eye and the image seen by the right eye is interpreted by the brain as indicating depth, and changes the eye convergence accordingly. However, as explained with reference to FIGS. 1A and 1B above, convergence and accommodation are not independent, and this has a limiting effect on a stereoscopic display.

FIG. 1C is a schematic illustration of a stereoscopic display that includes an image 3' of the distant object 3 of FIG. 1A and also includes an image 5' of the near object 5 of FIG. 1B. The stereoscopic image is being displayed on a display screen 7. The eyes of the observer will converge on a virtual object, such as the distant virtual object 3' or the near virtual object 5'. As a consequence of this, and of the inter-dependence of the convergence and accommodation processes, the eyes will focus on the apparent depth of the distant virtual object 3' or on the apparent depth of the near virtual object 5'. As a result, the plane of focus will not be coincident with the plane of the display screen, so that the virtual object will be out of focus if the apparent distance between the virtual object and the display screen is too great. Thus, virtual objects located too far out of or into the screen will cause the observer headaches and other discomfort.

A human can generally tolerate a certain amount of mis-match between accommodation and convergence without discomfort, and this allows a stereoscopic display to function within a limited depth either side of the display screen 7. The need to limit the depth of a virtual object behind or in front of a display screen places limitations on the parallax between the left eye image and the right eye image in the horizontal direction.

A further problem faced by a stereoscopic display is that the image presented to the left eye and the image presented to the right eye should not have objects that contain points that have been shifted vertically relative to other points in the scene—that is, the two images should not have "vertical disparity".

Vertical disparity is illustrated in FIG. 2A to 2C. FIG. 2A shows a real world view that contains an object 8 that is near to an observer, an object 10 that is distant from an observer, and an object 9 that is intermediate in distance from the observer between the near object 8 and the far object 10.

FIG. 2B shows the left eye image 11L and the right eye image 11R, of the real world view, as captured by a stereoscopic image capture device or stereoscopic camera. (The term "camera" will be used herein for convenience of description, rather than "image capture device". The term "camera" as used hereinbelow is intended to cover any device capable of capturing an image.)

FIG. 2C shows the result of superposing the left eye image 11L and the right image 11R of FIG. 2B. It will be noted that the left eye image of the near object 8 and the right eye image of the near object 8 are shifted horizontally and vertically relative to one another. The left eye image of the intermediate object 9 and the right eye image of the intermediate object 9 are also shifted relative to one another, but the horizontal shift and vertical shift are both considerably smaller than for the images of the near object 8.

Ideally, the two images presented to the eyes of an observer by a three-dimensional display system should not contain vertical disparity. Although the eyes can cope with a small amount of vertical disparity, this is only at the periphery of vision rather than at the fovea. The presence of such disparity in a converged imaging system such as the human eyes leads to keystone distortion, and this is corrected in the brain. In a stereoscopic display, therefore, no vertical disparity should exist so that the brain can correct the images on the retina properly. The design tolerance of a stereoscopic imaging system to the vertical disparity is small, and good images will not be obtained if there is significant vertical disparity present.

In the design of a stereoscopic camera, the camera arrangement and design are typically determined by the depth of the scene and displayed image (through the horizontal disparity) and the intended display method. However, the accuracy to which the features of the camera arrangement and design, such as the separation of the two cameras, the fields of view etc.) are specified depends on the maximum allowable vertical disparity in the scene which, for most scenes, is typically a very low level of vertical disparity. These requirements have placed significant limitations on the design, construction and use of stereoscopic cameras and thus make building a high-quality stereoscopic camera a difficult task. The horizontal and vertical parallax of the left-eye image and the right-eye image depends on many factors, such as the separation of the two cameras, the zoom and field view, the convergence of the optic axis of the two cameras, the display method etc. All these factors must be controlled in order to keep horizontal and vertical parallax between the two photographs within limits that will enable comfortable viewing of the resultant three-dimensional image.

Ideally there should be no vertical disparity between the left-eye image and the right-eye image. It is difficult to determine the accuracy to which this limit can be expressed, since this depends on what an average person would deem to be an acceptable level of vertical disparity. There have been numerous studies on this subject, but these have not provided any agreement as to what degree of vertical disparity is acceptable. In the case of an ideal digital display system the requirement that vertical disparity should be zero can be interpreted as meaning that the vertical disparity should be less than one pixel error. Errors in horizontal disparity that are greater than a single pixel manifest themselves as distortion of depth but, since depth distortion is present in stereoscopic images in any case, such errors do not cause great discomfort (as long as the horizontal disparity error is not too large). Thus, vertical disparity determines the accuracy with which the camera alignment and positioning must be specified in a three-dimensional camera system.

Recent developments in digital photography using digital cameras or scanners has made it possible to use computer software to correct a stereoscopic image pair that was obtained using a mis-aligned camera system, in which the positions of the cameras do not properly reflect the positions of the human eyes. This software makes it possible to use images obtained using a mis-aligned camera system, and so reduces the problem associated with physically aligning a camera system. However, this software is still at an early stage and currently available fully automated point matching correction software cannot properly correct for mis-aligned cameras. The software is either not sufficiently accurate to correct unaligned images properly, or it requires processing power and/or time that is simply not available on a small digital camera. Furthermore, scenes that contain a repeating pattern, (for example, a brick wall) can cause problems with the software, since there are many similar points on the two images and matching a point in one image with a corresponding point in the other image becomes difficult. A further disadvantage is that the software does not put information into an image, but it only corrects the orientation of the images—and it does this at the expense of image quality and possibly resolution (when cropping is involved).

The quality of such computer software is likely to improve with time. However, it will always be the case that the better the camera system is aligned, the shorter processing time will be required since it would be easier for the software to predict a matching point in the other image of an image pair. Good alignment of the camera system also helps where there are numerous similar areas in an image. Furthermore, the reduction in image quality and resolution are reduced if the cameras are correctly aligned.

The fundamental principle of a stereoscopic camera is the ability to acquire two separate images, one corresponding to the left eye image and the other corresponding to the right eye image. Many possible stereoscopic cameras have been proposed, but fundamentally they can be categorised into four different types, namely:
1. Single lens, single sensor system;
2. Multi-lens, single sensor system;
3. Single lens, multi sensor system; and
4. Multi-lens, multi sensor system.

FIGS. 3A(1) and 3A(2) show examples of a single lens, single sensor stereoscopic camera. FIG. 3A(1) shows a simple example of a stereoscopic camera system that comprises a camera 12 mounted for translation along a support such as an optical rail 13. The camera 12 may be moved between a first position in which it obtains an image for one eye and a second position in which it obtains an image for the other eye. The translational distance (d) between the two camera positions is approximately equal to the separation of the eyes of a human being. This distance (d) is also referred to as the "inter axial separation" of the two camera positions, since it is equal to the distance between the optic axis of the camera in its first position and the optic axis of the camera in its second position.

FIG. 3A(2) shows a more sophisticated stereoscopic camera system of the single lens, single sensor type. This stereoscopic camera 14 has a sensor 15 for capturing an image, and this sensor may be, for example, a CCD sensor. The camera 14 further has a lens 16 for focusing incoming light onto the sensor 15. A shutter 16 is disposed between the lens 16 and the sensor 15. The shutter has two independently controllable areas 17A, 17B, each of which blanks out approximately one half of the area of the lens 16. The area 17A of the shutter transmits, when open, light that would be perceived by the left eye and the area 17R transmits, when open, light that would be received by the right eye. FIG. 3(*a*) (2) shows the shutter 17 with the left eye area 17L in its open state and with the right eye area 17R in its closed state. The sensor 15 is therefore recording a left eye image. Once the left eye image has been recorded, the left eye area 17L of the shutter is closed, the right area 17R of the shutter is opened, and the sensor then records the right eye image. The left eye image and the right eye image together form a stereoscopic image pair.

The shutter 17 may conveniently be embodied as a liquid crystal display device (LCD), in which the left and right eye areas of the shutter 17L, 17R may be put in the "transmit" or "block" state by application of suitable voltage across the relevant part of the liquid crystal layer.

In the stereoscopic camera system of FIG. 3A(2), the inter axial—separation corresponds to the distance between the centre of the left eye area 17L of the shutter 17 and the centre of the right eye area 17R of the shutter 17.

As is clear from the above description, the two images that form a stereoscopic image pair are recorded time-sequentially in a single lens, single sensor stereoscopic camera system. A single lens, single sensor system fundamentally cannot therefore be used to obtain an error-free still stereoscopic image from a moving subject. Such a system does, however, have a high tolerance to mis-alignment of the camera.

FIG. 3B illustrates an example of a multi-lens single sensor stereoscopic camera system. The stereoscopic camera system of FIG. 3B has two lenses 16L, 16R for focusing incoming light on to a sensor 15 such as, for example, a CC sensor. The lenses are spatially separated in the lateral direction, so that one lens 16L receives light forming the left eye image and the other lens 16R receives light forming the right eye image. Light passing through a lens 16L, 16R is reflected by a mirror 19L, 19R onto a control mirror 20. The control mirror is switchable between a first position, shown in full in FIG. 3B, in which it completes the optical path from the left eye lens 16L to the sensor 15 (but blocks the optical path from the right eye lens 16R to the sensor), and a second position, shown in broken lines in FIG. 3B, in which it completes the optical path from the right eye lens 16R to the sensor 15 (and blocks the optical path from the left eye lens 16L to the sensor). Depending on the orientation of the mirror 20, therefore, the sensor records either a left eye image or a right eye image. The mirror 20 may oscillate backwards and forwards between its first orientation and its second orientation, or it may rotate continuously with pauses in the first and second positions.

A multi lens, single sensor stereoscopic camera of the type illustrated in FIG. 3B may be used to obtain a video stereoscopic image. Since the images forming a stereoscopic image pair are again recorded in a time-sequential manner it cannot obtain a still stereoscopic image from a moving subject.

FIG. 3C shows an example of a single lens, multi sensor stereoscopic camera. Incoming light is directed by a lens 16 onto two sensors. One sensor 15L obtains a left-eye image and the other sensor 15R obtains a right eye image. (The two sensors 15L and 15R may be embodied as two independently readable areas of a single sensor.) An optical system, formed in this example of mirrors 22L, 23L or 22R, 23R ensures that incoming light is directed onto the lens 16 in such a way that light forming the left eye image is directed onto the left sensor 15L, and that light forming the right eye image is directed onto the sensor 15R.

In a single lens, multi sensor system it is possible to obtain a left eye image and a right eye image simultaneously, and such a stereoscopic camera may therefore be used with a moving subject. A single lens, multi sensor stereoscopic camera also has the advantage that it can be applied to an existing camera, by fitting an appropriate incoming optical system. Such a system, however, has the disadvantage that it has a low tolerance to lens aberration.

FIG. 3D shows an example of a multi lens, multi sensor stereoscopic camera 24. This essentially comprises two conventional cameras 25L, 25R arranged side by side, and so a stereoscopic camera of this type is generally referred to as "stereoscopic camera pair". One camera 25L captures the left eye image, and the other camera system 25R obtains a right eye image. Each camera contains a sensor 15L, 15R and an optical system for focusing light on the sensor (the optical system is represented in FIG. 3D by a lens 16L 16R).

A multi lens, multi sensor stereoscopic camera can record a left eye image and the corresponding right eye image simultaneously, and so can be used to obtain either a video image or a still image. It has a disadvantage that it has a low tolerance to misalignment of the two cameras relative to one another.

The present invention is directed to aligning a stereoscopic camera that has a low tolerance to misalignment, and is particularly applicable to a multi lens, multi sensor system as shown in FIG. 3D. It may also be applied to a multi lens, single sensor system of the type shown in FIG. 3B.

An example of the alignment accuracy required in a multi lens, multi sensor system of the type shown in FIG. 3D will now be made. If it is assumed that each camera 25L 25R in the camera system 24 has a CCD 15L, 15R that has 1280×960 pixels (giving a total of 1.3 million pixels, SXGA), in ⅔" format (giving a pixel size of approximately 7 μm square) and with an 8 mm focal length lens, then the angular field sub tended by one pixel is about 0.9 mrad or 3 arcmin (1 arcmin equals (1/60°). In order for vertical disparity between a left eye image and a right eye image to be less than one pixel requires that the angular mis-match between the optic axis of one camera system and the optic axis of the other camera system must be less than 0.9 mrad in each plane. FIG. 4 illustrates a multi lens, multi sensor system of the type shown in FIG. 3D in which the optic axis of one camera 25R is misaligned relative to the optic axis of the other camera 25L. The above calculation indicates that the angular misalignment must be less than 0.9 mrad if the misalignment is not to affect the quality of a stereoscopic image pair captured by the camera. Misalignment can also occur as a result of rotation out of the plane of the paper in FIG. 4, and this mis-alignment must also be less than 0.9 mrad in order not to affect the image quality.

It should be noted that a higher resolution system with a longer focal length lens would require alignment to a greater accuracy than the above example.

The other source of mis-alignment in a multi sensor, multi lens stereoscopic camera system is translational errors—where the inter-axial separation of the two cameras is incorrect. The effect of such translational errors is shown in FIG. 5. FIG. 5 assumes that, if the two cameras 25L, 25R of a stereoscopic camera pair are positioned correctly as shown in full lines, the image of an object captured by the sensor 15R of the right camera 25R is centered on the sensor 15R. If the right camera 25R is not in its correct position, as shown in broken lines, the translational error causes the image to be off-centre on the sensor 15R of the right camera 25R. The distance by which the image is off-centre will depend on the translational error, and on the distance between the camera pair and the object. A translational error in the horizontal direction gives rise to horizontal disparity between the two images of an image pair, and a translational error in the vertical direction gives rise to vertical disparity between the two images of an image pair.

In addition to translational or rotational errors, there may also be other factors which cause misalignment between the optical axis of the two camera systems. Inaccuracies in the lenses of the camera systems, for example, may cause mis-alignment in the optical axis, and also cause the axis to shift with zoom, focus, aperture adjustment etc. Furthermore, tolerances in the manufacturing process mean that the two lenses 25L, 25R of the left and right camera systems are unlikely to be exactly identical to one another. As a result, production of a commercially successful stereoscopic camera pair is very difficult, owing to the difficulty in aligning and matching the two camera systems.

The difficulties in producing a stereoscopic camera pair can clearly be avoided by the use of a single sensor stereoscopic camera of the type shown in FIG. 3A or 3B, but these systems cannot take still photographs of moving subjects since the left-eye and right-views would be taken at different times. Single sensor systems are suitable for photograph so fast ill-subject, but many people do not want to be limited to a camera system that can not take photographs of moving subjects.

The use of a computer-based correction to compensate for the misalignment between the two cameras of a stereoscopic camera pair has been proposed, but no successful algorithm has been found. No successful algorithm has yet been found that can correct for lack of synchronisation between the two cameras of a stereoscopic camera pair which does not need knowledge about the scene photographed.

Stereoscopic camera systems based on holographic systems have been proposed. While overcoming some disadvantages of existing stereoscopic camera systems, holographic systems introduce their own problems (a coherent light source is required, recording a full colour image is difficult, etc.).

Various methods have been proposed for checking the alignment of the two cameras in a stereoscopic camera pair. One approach is to use a calibrated alignment chart of the type shown schematically in FIG. 6A(1). A stereoscopic camera pair 24 is calibrated by acquiring images of the calibration chart 26 using the left camera 25L and the right camera 25R, and comparing the image acquired by the left camera 25L with the image obtained by the right camera 25R. This process is shown schematically in FIG. 6A(2). The two images are analysed, and the results of the analysis are used to correct the relative alignment of the two cameras 25L, 25R of the stereoscopic camera pair 24. The images may be analysed either by hand, or by using a computer point matching algorithm.

This prior art technique has a number of disadvantages. The principal disadvantage is that the use of a calibration chart at a finite distance from a stereoscopic camera pair does not enable the alignment errors to be decomposed into translational errors and rotational errors. This is illustrated in FIG. 6B. The camera head M shown in broken lines in FIG. 6B is the result of translating the right camera head 25R from its correct position (shown in full lines as "head A") and also rotating the right camera head relative to the left camera head (shown as "head C"). As is shown schematically in FIG. 6B, it is possible that the combination of a translational error and a rotational error will place the image of one calibration point of the calibration chart 26 on the same point of the sensor in both the correctly aligned camera head A and the mis-aligned camera head M. As a result, a calibration chart will indicate, incorrectly, that the camera head A was correctly aligned with the camera head C. This happens because a rotational error about the separation axis (pitch) produces the same disparity error on the sensor as a translation (along an axis in the plane of the paper in FIG. 6B). It is not possible to separate translational errors and rotational errors unless the calibration chart is positioned far away from the stereoscopic camera system that is being aligned, and this would require the use of a large, accurately calibrated chart or a chart that has a three-dimensional nature to it (i.e., not a flat chart)—which would be both difficult to handle and expensive.

The use of a calibration chart also does not separate errors introduced by the lenses from errors introduced by the alignment of the sensors.

Another prior art approach to aligning the two cameras of a stereoscopic camera pair is computer-based analysis of calibrated charts, or non-calibrated scenes to determine parameters indicative of the mis-alignment of the two cameras. This process is shown schematically in FIG. 7A and FIG. 7B. FIG. 7A shows a typical scene used in this method. Each of the left and right cameras 25L, 25R acquires an image of this scene as shown schematically in FIG. 7B. The image from the left camera 25L and the image from the right camera 25R are analysed, and alignment parameters required to correct one of the images to match the other are found. This analysis may again be carried out by hand, or using a computer point matching algorithm. Manual analysis of the images can be slow, and is also tedious for the operator. Computer-based point matching can be faster, but it may well not reliably achieve sub-pixel accuracy if a non-calibrated scene was used. A further disadvantage is that this method cannot separate errors introduced by lens alignment/inaccuracy from sensor alignment errors. As a result, corrections required for an object in the scene at one apparent depth from the camera may require different correction parameters from an object at a different apparent distance from the camera.

Computer post-processing of images has also been suggested. However, post-processing of images of known errors suffers from similar problems to those outlined above. In addition, interpolation of images will degrade the quality of the final image.

The use of photo-geometric methods using lasers to measure the parameters of a conventional single camera has been proposed by T. A. Clarke et al., in "The principal point and CCD cameras" *Photogrammetric Record* Vol 16, No. 92 pp 293–312 (1998), and this method is illustrated schematically in FIGS. 8A and 8B. Initially, as shown in FIG. 8A a laser beam is directed towards a camera from which the lens is absent. The laser beam is aligned so as to be coincident with the optic axis of the camera, and to be incident on the centre of the sensor 15.

Once the laser beam has been correctly aligned, the lens 16 is inserted into the camera as shown in FIG. 8B. The position that the laser beam now makes on the sensor of the camera determines the "auto-collimation" position of the lens systems, and this is a measure of the inaccuracy in the lens 16. It is possible to derive a correction parameter for correcting photographs acquired by the camera.

Japanese Patent Application No. 9-312 808 (Sony Corporation) discloses a system for aligning a lens to a CCD sensor. The method involves placing marks on the CCD sensor, and aligning the lens relative to the marks to ensure correct alignment of the lens relative to the CCD. Although it might be possible to use such a method to align two CCDs relative to an external datum, in order to achieve the desired accuracy (less than one pixel to prevent vertical disparity) it would be necessary to position the marks on the CCDs to within an error of less than one pixel size. As a pixel typically has a dimension of less than 10 µm, positioning the marks to the required accuracy would be extremely difficult to do.

U.S. Pat. No. 5,877,854 discloses an alignment system for an optical device using two sensors and two light sources. Laser beams are projected downwards onto line CCD sensors. This apparatus can achieve the required alignment accuracy with regard to rotation about one axis, but cannot provide accurate alignment with regard to alignment about three orthogonal axes.

M. Aggerwal et al disclose, in "Camera Centre Estimation", Proc. 15$^{th}$ International Conference on Pattern Recognition, Vol. 1 pp 876–80 (2000) a method of determining the optical centre of a camera system. The method uses two calibration charts, and a computational post-processing method. The quoted accuracy is around 3.6 pixels, which is too large an error for this method to be suitable for correcting the alignment of two cameras in a stereoscopic camera pair.

EP-A-0 506 039 discloses an apparatus for measuring the position of the edge of a cutting tool. The apparatus has a "reference plate" that is positioned near the edge of the cutting tool, so that a slit is defined between the reference plate and the edge of the cutting tool. The apparatus also has a laser for generating a light beam that is directed at the slit defined between the reference plate and the edge of the cutting tool. The slit diffracts the light beam, and the resultant diffraction pattern provides information about the width of the slit and hence about the position of the cutting tool relative to the reference plate.

U.S. Pat. No. 5,073,918 discloses a method of X-ray crystal diffraction used for determining the orientation of the crystal axes of a silicon wafer. A beam of X-rays is directed at a silicon wafer which is mounted on a goniometer in the path of the X-rays, and the resultant X-ray diffraction pattern is detected by a photosensor array.

U.S. Pat. No. 3,787,117 discloses an apparatus for inspecting a work piece. A workpiece having a repeat pattern, such as a photo mask, is positioned in the path of light from a source. A mask having two apertures is disposed behind the workpiece, and the apertures of the mask give rise to diffraction patterns. The diffracted images then pass through a grating which is asymmetrically positioned with respect to the optical axis of the apparatus. The resultant image is displayed on a screen, and provides information about non-periodic errors in the workpiece.

U.S. Pat. No. 3,656,838 discloses a filter for use in an optical character identification system. A plate displaying a character is placed in a light beam, and the light output from the plate passes through a two-dimensional diffraction grating. The diffracted image then passes through a filter. The final image provides information about the particular character displayed on the plate.

SUMMARY OF THE INVENTION

A first aspect of the present invention provides an apparatus for determining the orientation and/or position of a structure, the apparatus comprising: a first light source for generating a first light beam; a first mount for mounting a first structure so as to be in the optical path of the first light beam and such that the position and/or orientation of the first structure, relative to the first light beam, is adjustable; first capture means for capturing a diffraction pattern produced by the first structure; a second light source for generating a second light beam, the optical path of the second light beam being at a pre-determined orientation to the optical path of the first light beam; a second mount for mounting a second structure so as to be in the optical path of the second light beam; and second capture means for capturing a diffraction pattern produced by the second structure.

The diffraction pattern produced by the structures provides information about the orientation and position of the structures relative to the support. The use of a diffraction pattern to monitor the position and orientation of the structures has the advantage that rotational errors are de-coupled from translational errors.

The invention further allows the position and orientation of two structures to be checked simultaneously.

The invention may be applied to the orientation of any structure that produces a diffraction pattern. Examples of diffracting structure to which the invention may be applied include, but are not limited to, a CCD sensor, a diffraction gratings and a micro-optical array (such as, for example, a micro lens array).

The invention may be used to determine the orientation and/or position of the structure relative to a support, mount, housing, body etc. to or within which the structure is to be mounted. Where the structure has already been mounted on or within a support, mount, housing, body etc., the invention may alternatively be used to align the support, mount, housing, body etc. relative to another object or datum.

The apparatus may comprise first adjusting means for adjusting the position and/or orientation of the first structure relative to the support. If the diffraction pattern obtained initially shows that the position and/or orientation of the structure is/are incorrect, the position and/or orientation of the structure may be adjusted as necessary.

The apparatus may further comprise a support and first fixing means for fixing the position and orientation of the first structure relative to the support. Once the position and/or orientation of the structure have been adjusted to eliminate any errors compared with a desired position/ orientation, the position and orientation of the structure may be fixed. When the invention is applied to a sensor in a camera body, for example, it allows the position and orientation of a sensor in a camera body to be adjusted and then fixed relative to the camera body. Alternatively it allows the position and orientation of a camera body, in which a sensor has already been mounted, to be adjusted relative to an external object or datum and then fixed relative to the external object or datum.

The second mount may be such that the position and/or orientation of the second structure, relative to the support, is adjustable.

The apparatus may comprise adjusting means for adjusting the position and/or orientation of the second structure relative to the second light beam. It may further comprise fixing means for fixing the position and orientation of the second structure. Where this embodiment of the invention is applied to a stereoscopic camera pair it provides information on the position and orientation of both sensors in the stereoscopic camera pair, and allows the position and orientation of each sensor to be adjusted as necessary and then fixed.

The second light source may be the first light source and the apparatus may comprise a beam-splitter for producing the first light beam and the second light beam from light emitted by the first light source.

The apparatus may comprise means for generating a pre-determined phase difference between the first light beam and the second light beam. The pre-determined phase difference may be $(2n-1)\lambda/2$, where $\lambda$ is the wavelength of light emitted by the first light source and n is a natural number. If the phase difference is an odd number of half wavelengths, the diffraction patterns produced by the two structures will be exactly out of phase with one another and so will cancel where the two patterns overlap.

The second capture means may be the first capture means whereby the first capture means captures, in use, a diffraction pattern produced by the first structure and a diffraction pattern produced by the second structure. The apparatus may comprise a null detector for determining whether the sum of the diffraction pattern produced by the first structure and the diffraction pattern produced by the second structure is zero.

The path of the first light beam when incident on the first structure may be parallel to the path of the second light beam when incident on the second structure. Alternatively, the path of the first light beam when incident on the first structure may be divergent from the path of the second light beam when incident on the second structure.

The or each structure may be an optical component, for example a microlens array or a CCD sensor. The first structure may be nominally identical to the second structure.

A second aspect of the present invention provides an apparatus for determining the orientation and/or position of a structure, the apparatus comprising: a first light source for generating a first light beam; means for mounting a diffractive structure in the optical path of the first light beam; capture means for capturing a first diffraction pattern generated, in use, by the diffractive structure from the first light beam; means for mounting a first structure in the optical path of the first light beam such that the position and/or orientation of the first structure is adjustable relative to the diffractive structure; a second light source for generating a second light beam, the mounting means being adapted to mount the diffractive structure in the optical path of the second light beam; and second capture means for capturing a second diffraction pattern generated by the diffractive structure from the second light beam.

This embodiment of the invention may be used, for example, to determine whether one or both of the mirrors 19L, 19R in a multi-lens, single sensor camera of the type shown in FIG. 3B is/are correctly positioned and oriented.

The apparatus may comprise adjusting means for adjusting the position and/or orientation of the first structure relative to the diffractive structure. It may further comprise means for fixing the position and/or orientation of the first structure relative to the diffractive structure.

The apparatus may further comprising a means for mounting a second structure in the optical path of the second light beam such that the position and/or orientation of the second structure is adjustable relative to the diffractive structure. It may further comprise second adjusting means for adjusting the position and/or orientation of the second structure relative to the diffractive structure, and it may further comprise second fixing means for fixing the position and/or orientation of the second structure relative to the diffractive structure.

The first structure may be an optical component and the second structure may be an optical component. The first optical component may be a mirror. The second optical component may be a mirror.

The or each light source may be a laser.

A third aspect of the invention provides a method of determining the orientation and/or position of a structure, the method comprising the steps of: directing a first light beam having a first pre-determined orientation at a first structure; capturing a first diffraction pattern produced from the first light beam; deriving information about the orientation and/or position of the first structure from the first diffraction pattern; directing a second light beam at a second structure, the first and second light beams having pre-determined orientation relative to one another; capturing a second diffraction pattern produced from the second light beam; and deriving information about the orientation and/or position of the second structure from the second diffraction pattern.

The method may comprise adjusting the position and/or orientation of the first structure, relative to the first light beam, on the basis of information derived from the first diffraction pattern.

The method may comprise adjusting the position and/or orientation of the second structure, relative to the first structure, on the basis of information derived from the first and second diffraction patterns.

A fourth aspect of the invention provides a method of determining the orientation and/or position of a structure, the method comprising the steps of: directing a first light beam at a diffractive structure along a first optical path that includes a first structure; capturing a first diffraction pattern produced from the first light beam; and deriving information about the orientation and/or position of the first structure from the first diffraction pattern; directing a second light beam at the diffractive structure along a second optical path that includes a second structure; capturing a second diffraction pattern produced from the second light beam; and deriving information about the orientation and/or position of the second structure from the second diffraction pattern.

The method may comprise adjusting the position and/or orientation of the first structure, relative to the diffractive structure on the basis of information derived from the first diffraction pattern.

The method may comprise adjusting the position and/or orientation of the second structure, relative to the first structure, on the basis of information derived from the first and second diffraction patterns.

A fifth aspect of the invention provides an apparatus for determining the orientation and/or position of a structure, the apparatus comprising: a first light source for generating a first light beam; a first mount for mounting a first structure in the optical path of the first light beam such that the position and/or orientation of the first structure, relative to the first light beam, is adjustable; first capture means for capturing a diffraction pattern produced by the first structure; a support; and fixing means for fixing the position and orientation of the first structure relative to the support; wherein the support is movable relative to the optical path of the first light beam. This aspect of the invention may be applied to, for example, manufacture of a stereoscopic camera pair. A first camera may be aligned and mounted on a support, such as a support rail. The support may then be translated by a pre-determined distance, and a second camera may be aligned and mounted on the support.

The support may be movable in a direction substantially perpendicular to the direction of the first light beam.

A sixth aspect of the present invention provides a method of determining the orientation and/or position of a structure, the method comprising the steps of: directing a light beam having a pre-determined orientation at a first structure; capturing a first diffraction pattern produced by the first structure; adjusting the orientation and/or position of the first structure from information derived from the first diffraction pattern; fixing the position and orientation of the first structure relative to a support thereby to mount the first structure on the support; moving the support with respect to the light beam; and mounting a second structure on the support.

The step of mounting the second structure on the support may comprise: positioning the second structure in the optical path of the light beam; capturing a second diffraction pattern produced by the second structure; adjusting the orientation and/or position of the second structure from information derived from the second diffraction pattern; and fixing the position and orientation of the second structure relative to the support thereby to mount the second structure on the support.

The step of moving the support with respect to the light beam may comprise moving the support in a direction substantially perpendicular to the optical path of the light beam.

A seventh aspect of the present invention provides an apparatus for determining the orientation and/or position of an optical component, the apparatus comprising: a light source for generating a light beam; a mount for mounting an optical component so as to be in the optical path of the light beam such that the position and/or orientation of the optical component, relative to the light beam, is adjustable; and capture means for capturing a diffraction pattern produced by the optical component.

The optical component may be selected from the group consisting of: a microlens array, a CCD sensor and a diffraction grating.

An eighth aspect of the present invention provides an apparatus for determining the orientation and/or position of a structure, the apparatus comprising: a light source for generating a light beam; means for mounting a diffractive structure in the optical path of the light beam; capture means for capturing a diffraction pattern generated by the diffractive structure from the light beam; means for mounting a structure in the optical path of the light beam such that the position and/or orientation of the structure is adjustable relative to the diffractive structure; and means for obtaining information about the position and/or orientation of the structure from the diffraction pattern.

BRIEF DESCRIPTION OF THE DRAWINGS

Preferred embodiments of the present invention will now be described by way of illustrative example with reference to the accompanying figure in which:

FIGS. 2A to 2C illustrate the occurrence of horizontal and vertical disparity;

FIGS. 3A(1) and 3A(2) illustrate a single lens, single sensor stereoscopic camera system;

FIG. 3B illustrates a multi-lens, single sensor stereoscopic camera system;

FIG. 5 illustrates a translational alignment error in a stereoscopic camera pair;

FIGS. 6A(1) and 6A(2) illustrate a prior method of calibrating the alignment of a stereoscopic camera pair;

FIG. 6B illustrates a potential disadvantage with the method of FIGS. 6A(1) and 6A(2);

FIGS. 10B(1) to 10B(4) illustrate the effect of different alignment layers on a diffraction pattern obtained in an apparatus according to the present invention;

FIG. 11 illustrates an apparatus according to a second embodiment of the present invention;

Like reference numerals denote like components throughout the description.

DESCRIPTION OF THE PREFERRED EMBODIMENTS

Figure 9A:
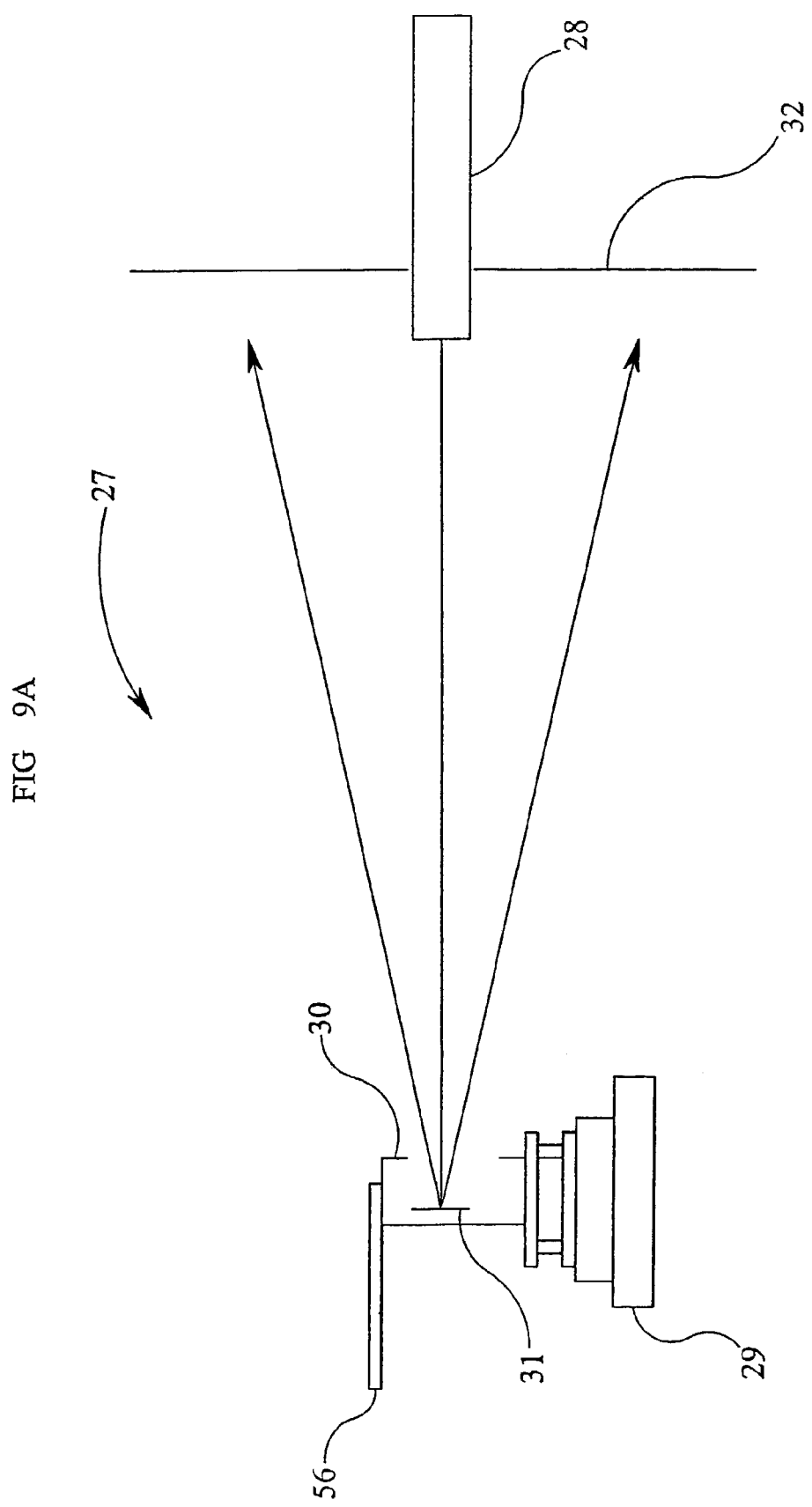
FIG. 9A is a schematic illustration of an apparatus according to one embodiment of the present invention.

FIG. 9A is a schematic illustration of an apparatus 27 according to a first embodiment of the present invention, and illustrates the general principle of the invention. In this embodiment the structure to be aligned is an optical component, namely the sensor of a camera, but, as noted above the invention may be applied to aligning any diffractive optical component.

The apparatus 27 comprises a source 28 of a collimated beam of light. In the embodiment of FIG. 9, a laser is used as the light source 28, but the invention is not limited to a laser. Any light source having sufficient coherence to enable a diffraction pattern to be formed may in principle be used. It should be noted that the term "light beam" as used herein is not limited to a beam of visible light. The invention is not limited to use with visible light.

The apparatus further comprises a support 29 on which a camera body 30 is to be fixedly mounted. A sensor 31 such as a CCD sensor has already been mounted and aligned within the camera body 30. The apparatus comprises mounting means 56 that support the camera body 30 in approximately the correct position on the support 29. The camera body is initially supported by the mount 56, and is initially free to move relative to the support 29.

The support 29 may be a support rail for stereoscopic camera pair, and it may be desired to mount two camera bodies at pre-determined positions, and at pre-determined orientations, on the support rail. The invention is not limited to this application however.

The light source 28 is arranged to generate the light beam at a pre-determined orientation and position to the support 29. The light source 28 may be aligned relative to the support by any conventional process that ensures that the support is at a known orientation and/or position to the light beam.

The sensor 31 contains a regular array of pixels, and may comprise a microlens array, and accordingly the sensor 31 will diffract the light beam upon reflection and set up a diffraction pattern. The apparatus 27 comprises a capture device 32 for capturing the diffraction pattern generated by the sensor. If the light source 28 emits a beam of visible light, the capture device 32 could in principle simply consist of a screen on which the diffraction pattern is displayed.

The present invention makes use of the diffraction pattern recorded by the capture device 32 to determine whether the alignment of the sensor 31 relative to the light beam is correct. Since the support 29 is at a predetermined position and orientation to the light beam, aligning the sensor relative to the light beam has the effect of aligning the sensor relative to the support 29. Furthermore, since the sensor 31 is already mounted within the camera body, aligning the sensor relative to the light beam has the effect of aligning the camera body relative to the support 29.

One advantage of using the diffraction pattern to determine the orientation and position of the sensor 31 is that it enables the effect of translational alignment errors to be decoupled from rotational alignment errors. In a preferred embodiment the capture means 32 is provided with pre-aligned marks or sensors that should coincide with maxima in the diffraction pattern if the sensor 31 is correctly aligned relative to the support rail. By comparing the actual positions of these diffraction maxima with their expected positions, it is possible to obtain information about the alignment errors of the sensor relative to the support rail. Where the capture device 32 is provided with sensors at the expected positions of diffraction maxima, these can be, for example, knife-edge photo-diodes or position sensitive detectors.

The sensor 31 will has a finite size and a regular structure. The resultant diffraction pattern will therefore be independent of the point on the sensor at which the light beam is incident on the sensor. The diffraction pattern, and its position on the capture device 32, will depend on the angular orientation of the sensor 31 relative to the light beam, on the diffracting apertures of the sensor, on the wavelength of light emitted by the light source, and on the distance between the screen 32 and the sensor. These alignment errors will manifest themselves in different ways, as shown in FIGS. 10B(L) to 10B(4).

Figure 10A:
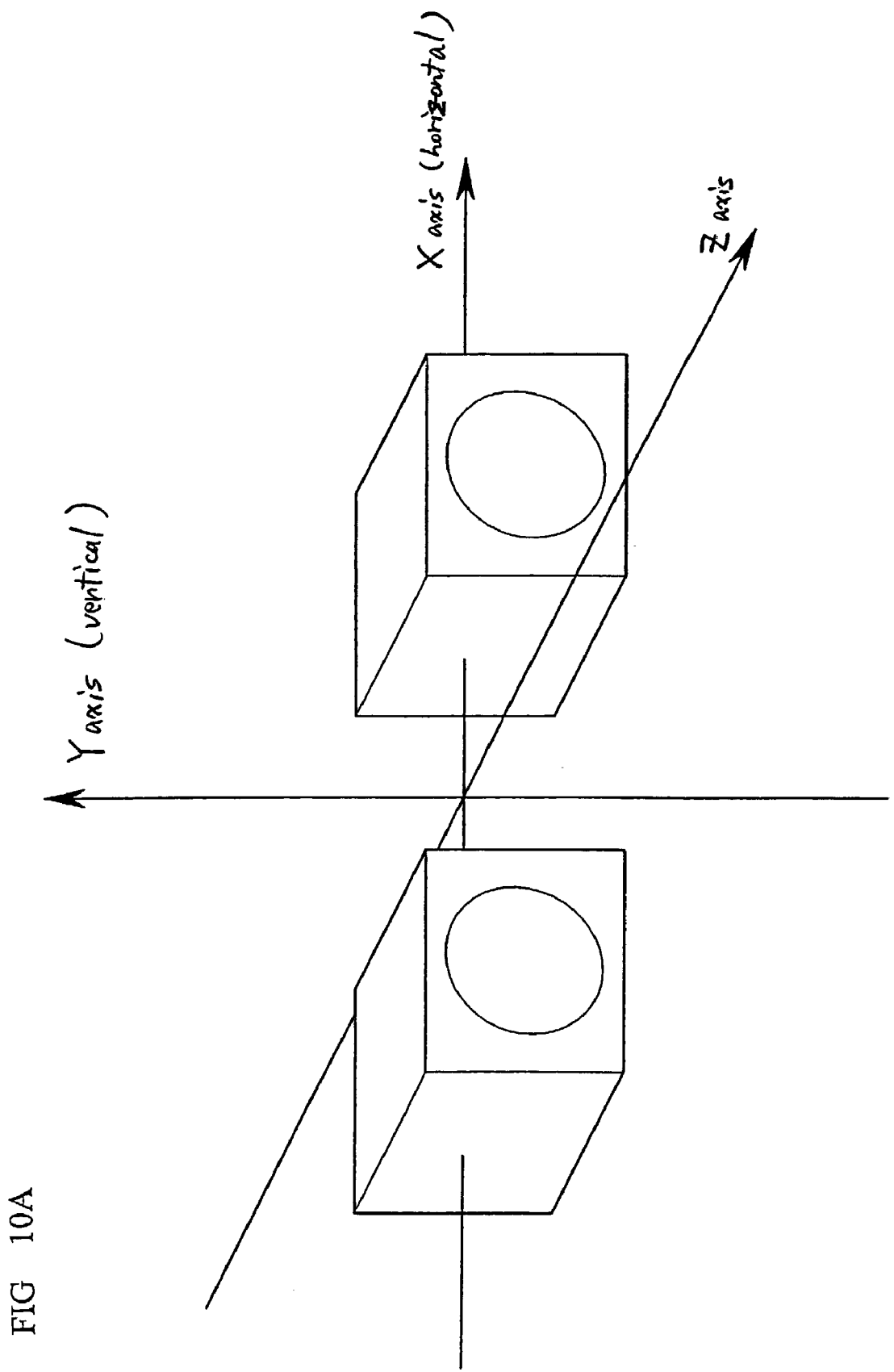
FIG. 10A illustrates the axis labelling used.

Translation of the sensor along the axis between the light source 28 and the sensor—this is denoted by the z-axis in FIG. 10A—will widen or narrow the diffraction pattern on the capture device, as shown in FIGS. 10B(1). The squares 33 in FIG. 10B represent the index marks or position sensors of the capture device 32, and the triangles 34 represent the maxima in the diffraction pattern. If the sensor 31 is correctly positioned relative to the camera housing 30, the diffraction maxima 34 should be coincident with the index marks or sensors 33 of the image capture device. In FIG. 10B(1) the diffraction pattern is narrowed compared to the expected diffraction pattern, and this indicates that the separation between the sensor 31 and the light source 28 is slightly smaller than it should be.

FIG. 10B(2) shows the diffraction pattern obtained if the sensor 31 is misaligned by a small angle about the x-axis (the horizontal axis as shown in FIG. 10A). It can be seen that a misalignment error involving a small rotation about the x-axis will shift the diffraction maxima up or down relative to their expected positions.

FIG. 10B(3) shows the diffraction pattern obtained if the sensor 31 is misaligned by a small angle about the y-axis (the vertical axis as shown in FIG. 10A). It can be seen that misalignment by rotation about the y-axis will shift the diffraction maxima to the left or right relative to their expected positions.

Finally, FIG. 10B(4) illustrates the effect on the diffraction pattern of an alignment error that consists of a small rotation about the z-axis. As can be seen in the FIG. 10B(4) a misalignment error consisting of a rotation about the z-axis has the effect of rotating the diffraction pattern about the centre of the screen relative to its expected positions.

It can be seen from FIG. 10B(1) to 10B(4) that each of these alignment errors—rotation about the x-axis, rotation about the y-axis, rotation about the z-axis and translation along the z-axis has a distinguishable effect on the diffraction pattern. It is therefore possible to analyse the diffraction pattern produced by a sensor in a camera housing, and deduce whether the sensor is misaligned in any of these ways.

As noted above, the diffraction pattern is independent of the point at which the light beam is incident on the sensor 31, so that translational misalignment along the x- or y-axis cannot be deduced from the diffraction pattern. However, in most stereoscopic camera pairs, it is not necessary to align the sensors to a high degree of accuracy in the x- and y-directions. Furthermore, the translational alignment of the sensor along the x- and y-axes may be checked simply by determining the point at which the light beam is incident on the sensor.

In order to align the camera body correctly with regard to the support, the apparatus 27 preferably comprises means for adjusting the position and/or orientation of the camera body, relative to the support 29, to correct for any alignment errors that are deduced from the diffraction pattern. In the embodiment of FIG. 9A the camera body 30 is mounted on the mounting means 56 such that the orientation and/or position of the camera body 30 relative to the support rail 29 may be adjusted—thereby altering the orientation and/or position of the sensor 31 relative to the light beam, since the sensor 31 is already mounted in the camera body. If it is desired to check for translational errors in the x- and y-directions, this can be done as outlined above by determining where the light beam is incident on the sensor. The position—of the camera body—and hence the position of the sensor—in the x- and/or y-direction can be adjusted if necessary. When the camera body is aligned such that the sensor is correctly placed and correctly oriented with respect to the light beam, the maxima of the diffraction pattern will be exactly coincident with the index marks or sensors of the capture means 32.

Means are preferably provided for fixing the camera body relative to the support 29, once the position and/or orientation of the camera body have been adjusted so that the sensor has been correctly positioned and correctly oriented. Fixing the camera body relative to the support rail ensures that the sensor is maintained in the correct position and orientation relative to the support.

Figure 9B:
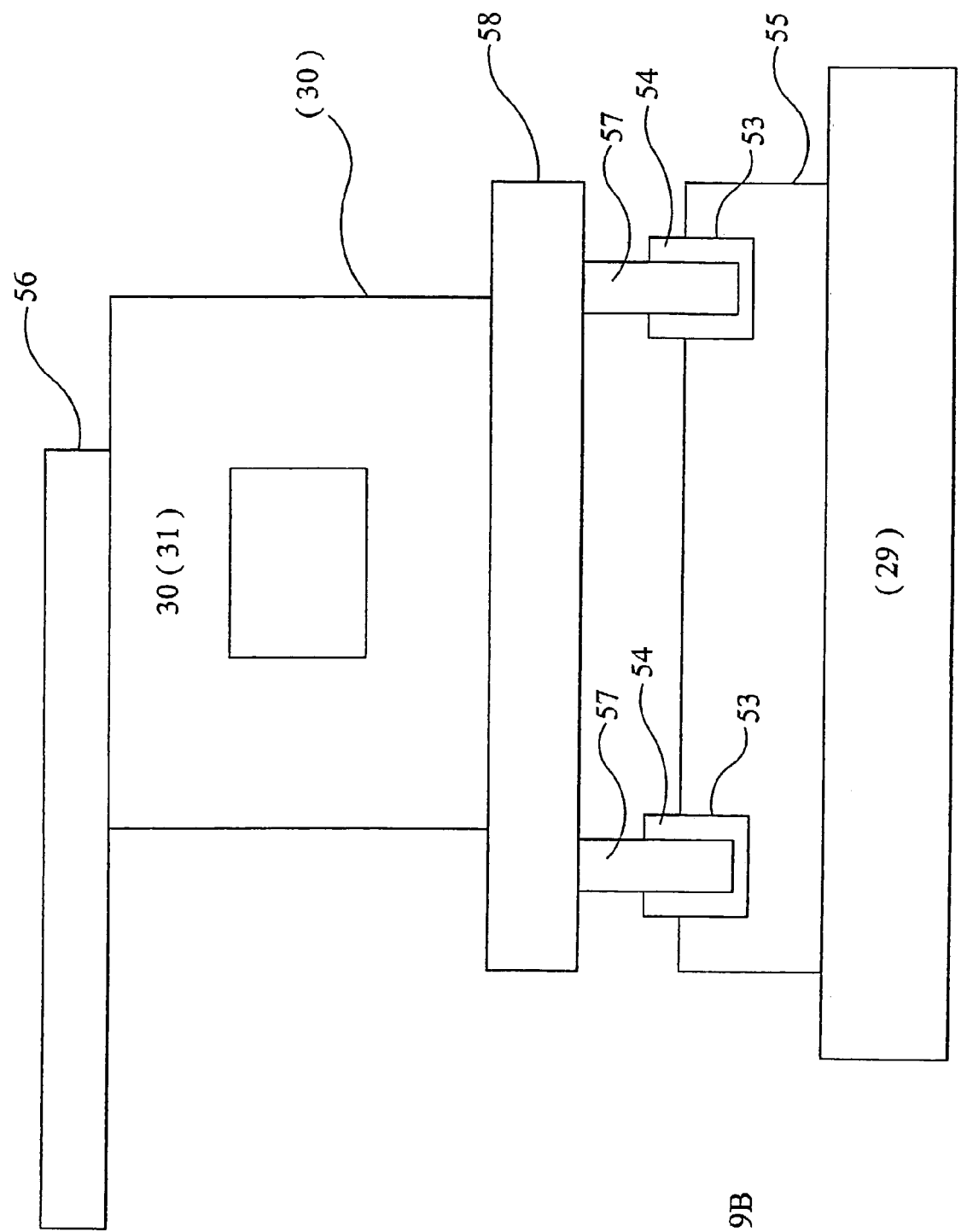
FIG. 9B is a partial enlarged view of FIG. 9A.

One example of suitable fixing means is shown in FIG. 9B, which is a partial enlarged view of FIG. 9A.

In the embodiment of FIG. 9B the camera body 30 is provided with one or more alignment pins 57 which project from the face of the camera body that is intended to be closest to the support (this face of the camera body will hereinafter be referred to as the "base" of the camera body, for convenience). In FIG. 9B the alignment pins 57 project from a plate 58 secured to the camera body but, in principle, the alignment pins 51 could be integral with the camera body.

The face of the support that is intended to be closest to the camera body (hereinafter referred to as the "upper face" for convenience) is provided with one or more recesses 53 at locations that each generally corresponds to the expected location of an alignment pin 57 when the camera body is correctly positioned and oriented on the rail 29. Each recess 53 has a cross-section that is larger than the cross-section of the corresponding alignment pin 57. The recesses 53 in FIG. 9B are provided in a plate 55 attached to the upper face of the support rail 29 but, in principle, the recesses 53 could be provided in the support rail itself.

The camera body is connected to the mount 56 in such a way that the camera body can undergo translational and rotation movement relative to the mount 56. It is thus possible to alter the position and orientation of the camera body, relative to the support rail 29, while the camera body is connected to the mount 56.

To align the camera body on the support rail 29, the camera body is initially positioned over the support rail 29, while connected to the mount 56. The camera body is positioned such that each alignment pin 57 is received in a corresponding recess 53—but the position and orientation of the camera body, relative to the rail 29, are not fixed at this point because the alignment pins can move within their respective recess. Furthermore, the mount 56 preferably holds the camera body above the rail such that lower ends of the alignment pins 57 do not touch the bottom of the respective recess, and this allows the camera body to be tilted about the z-axis.

The position and/or orientation of the camera body, relative to the support rail 29, may then be adjusted, as described above, until the desired diffraction pattern is obtained—which indicates that sensor is correctly aligned, relative to the light beam.

The camera body may then be fixed relative to the support 29, to preserve the camera body in the position and orientation that provide correct alignment of the sensor 31. One convenient way of doing this is to introduce adhesive 54 into each recess 53 in the support rail 29, so as to fix each alignment pin 57 relative to the support rail 29.

Once the adhesive 54 has cured, the camera body may then be disconnected from the mount 56.

The lens of the camera is absent during the alignment process of the present invention. The alignment of the sensor is therefore independent of any lens misalignment, or inaccuracies in the lens.

This embodiment of the invention is not limited to aligning a sensor of a camera relative to a support rail, but may be used generally to align any diffractive optical component relative to a support, mount, housing, etc.

The present invention may be applied to the alignment of a stereoscopic camera pair in a number of ways. For example, it would be possible to align a first camera body, within which a sensor had been mounted, relative to a support rail and fix the first camera body in position on the support rail. This would fix position of the first camera body on the support rail, and would also fix the orientation of the first camera body relative to the support rail. The support rail is moved relative to the light source. Preferably, the support rail is moved in a direction substantially perpendicular to the light beam (that is, substantially along the x-axis). A second camera body, within which a sensor had been mounted, may then be placed on the support rail 29, and the alignment and fixing processes repeated for the second camera body. This would lead to a correctly aligned stereoscopic camera pair, as each camera body would have been aligned relative to the support rail.

In an alternative embodiment, the apparatus is arranged to generate two light beams, one along the intended axis of one camera body of a stereoscopic camera pair, and the other light beam coincident with the optical axis of the other camera body of a stereoscopic camera pair. This allows the position and orientation of two camera bodies (each containing a sensor that has previously been aligned) to be checked using the respective diffraction patterns, without the need to move the support rail or light source. This embodiment may use two light-sources, or it might use a single light source and a beam splitter to generate the two required light beams. The beam splitter may be a "passive" beam splitter, such as a prism having an internal interface that partially reflects and partially transmits incident light. Alternatively, the beam splitter could be an "active" device such as rotating or oscillating mirror that generates two output light beams from one input beam. In principle, this embodiment of the invention could also be carried out by using a single light source that can be moved from one position to another to generate the two required beams of light.

The invention may also be used for the initial step of aligning a sensor within a camera body. To do this, the sensor is initially mounted in the camera body such that the position and/or orientation of the sensor, relative to the camera body, may be adjusted. The camera body is then mounted on a suitable support, for example the support rail 29 of FIG. 9B, at a predetermined position and orientation relative to the light beam and such that the sensor 31 is in the path of the light beam. The diffraction pattern produced by the sensor when illuminated by the light beam may then be used to adjust the position and/or orientation of the sensor, in the manner generally described above. In this embodiment, however, the position and/or orientation of the sensor relative to the camera body is/are adjusted. The position and/or orientation of the camera body relative to the support are not altered.

Figure 8A:
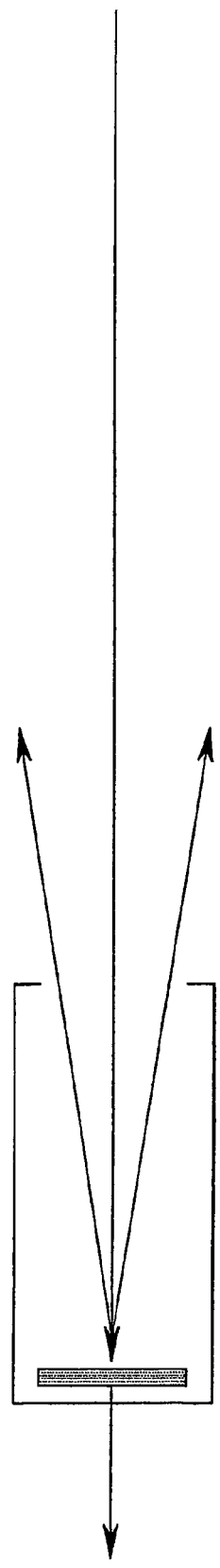
FIGS. 8A and 8B illustrate a method of determining the principal point of a lens of a camera.
Figure 8B:
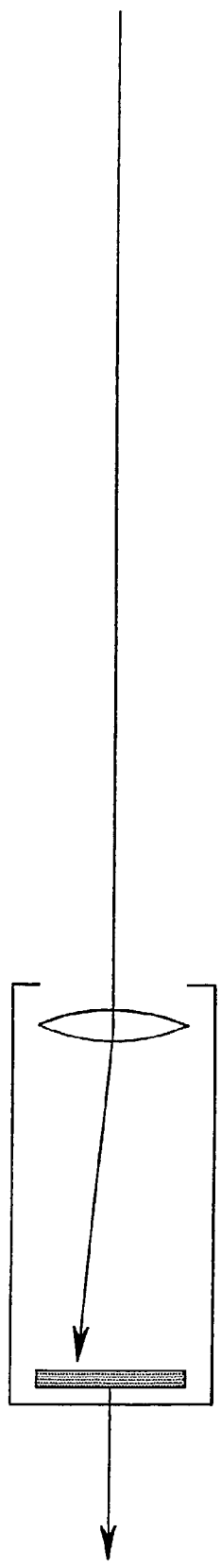

In the embodiment shown in FIG. 9A the camera body is aligned in the absence of the camera lens. Once the camera body has been aligned, the lens may then be fitted and aligned. The lens may be aligned using, for example, the method proposed by Clarke et al. (supra) and described with reference to FIGS. 8A and 8B. In brief, the camera body would be arranged so that the light beam was incident on the centre of the sensor. The lens would then be placed in position. The point on the CCD to which the lens deflects the light beam is the principal point of the lens, and this can be recorded. The two images acquired by a stereoscopic camera pair may be corrected for lens alignment if the positions of the principal points of the two cameras are known—it is possible to make a simple correction by translating the image for one eye relative to the image for the other eye, without the need to interpolate pixels and reduce the image quality. Once the two images have been translated relative to one another, and any overhanging areas in either image can be cropped to produce a fully aligned three-dimensional image.

FIG. 11 illustrates an apparatus 50 according to a further embodiment of the invention. This is similar in principle to the embodiment of FIG. 9, but includes a plurality of light sources 28A . . . 28D, for example a plurality of lasers. The light sources 28A . . . 28D are aligned such that the emitted light beams are parallel to one another. Each beam is incident on a respective sensor 31A . . . 31D mounted in a camera body (not shown) that is to be aligned with regard to a support rail (also not shown), and thus each beam gives rise to a diffraction pattern from a respective sensor 31A . . . 31D. The camera bodies are mounted on the support such that their position and orientation relative to the support may be altered. For example, each camera body could be mounted on the support in a similar manner to the embodiment of FIG. 9B. The diffraction patterns are captured by an image capture device such as a screen 32.

FIG. 11 shown only the central two light sources 28B, 28C emitting light beams, so that each beam generates a diffraction pattern from the respective sensors 31B, 31C. If the sensors 31B, 31C are nominally identical to one another (that is, they are identical to one another within the limits of manufacturing tolerance) the two diffraction patterns will be substantially identical to one another. The two diffraction patterns overlap in the region of the screen shown as 32B. In a preferred embodiment, the distance between the screen 32 and the sensors 31 is chosen such that the maxima of the two diffraction patterns should overlap when the camera bodies housing the two sensors 31B, 31C are correctly aligned relative to one another. The camera bodies housing the two sensors 31B, 31C may easily be aligned relative to one another in this preferred embodiment, by setting up the diffraction patterns and adjusting the position and/or orientation of one or both camera bodies—and thereby and adjusting the position and/or orientation of one or both sensors 31B, 31C—until the maxima of the two diffraction patterns coincide with one another.

The absolute alignment of the camera bodies may be checked using those areas of the diffraction patterns that do not overlap—that is, the portion of the diffraction pattern generated by the sensor 31B that falls on the region 32A of the screen, and the portion of the diffraction pattern generated by the sensor 31C that falls on the region 32C of the screen 32 between the laser 28C and the laser 28D. The absolute alignment of the camera bodies housing the sensors 31B, 31C maybe established from these non-overlapping areas of the diffraction pattern, and the position and/or orientation of the camera bodies can be adjusted if necessary. Thus, this embodiment makes it possible to align two camera bodies, firstly, with respect to one another and, secondly, with respect to a pre-determined alignment.

As an example, the camera bodies housing the two sensors 31B and 31C maybe aligned by initially monitoring the non-overlapping portion of the diffraction pattern produced by one sensor, for example the sensor 31B. This enables the absolute alignment of the camera body housing the sensor 31B to be established and, if necessary, corrected by adjusting the position and/or orientation of the camera body. (By "absolute alignment" is meant the alignment relative to a fixed component such as, for example, the support 29 of FIG. 9.) Once the camera body housing sensor 31B has been correctly aligned, the alignment, relative to one another, of the camera bodies housing the two sensors 31B, 31C may be checked, by use of the overlapping portions of the diffractive patterns produced by each sensor. Any inaccuracies in the relative alignment of the two camera bodies can be corrected by adjusting the position and/or orientation of the camera body containing the second sensor 31C. At this stage, since the absolute alignment of the first camera body is correct, and since the two camera bodies are correctly aligned to one another, it follows that the absolute alignment of the second camera body should also be correct. This can be verified from the non-overlapping portion of the diffraction pattern produced by the second sensor 31C.

The position and orientation of each camera body may be fixed once it has been correctly aligned.

The embodiment of FIG. 11 may be used to align the camera bodies of a stereoscopic camera pair. The lateral separation between the light beam produced by light source 28B and the beam produced by light source 28C is equal to the separation between the optical axis of the left camera and the optical axis of the right camera, and so is preferably equal to the average separation between the left eye and the right eye of a human being.

The other light sources 28A, 28D shown in FIG. 11 are of use in aligning camera bodies of a multi-camera 3-D camera, for example for aligning the camera bodies of a multi-view camera or a camera for 3-D still "look-around" shots. The light sources 28A, 28D may be omitted if it desired to align only two camera bodies each containing a single sensor. Conversely, more than four light sources could in principle be used, if required.

In principle, the capture device 32 in the embodiment of FIG. 11 may, if the light sources 28A-28D emit visible light, simply consist of a screen on which the diffraction pattern is displayed. For improved accuracy and/or to allow use of light sources outside the visible spectrum, however, the image capture device may comprise detectors 35 disposed at positions where the maxima of the two diffraction patterns produced by the sensors 31B and 31C should overlap assuming correct alignment of the sensors. The capture device 32 may further comprise additional sensors 36, 37 disposed where the non-overlapping portions of the diffraction patterns generated by the sensors will be directed, at the expected positions of maxima in the diffraction patterns. The sensors 35, 36, 37 may be, for example, knife-edge photodiodes or position sensitive detectors.

The embodiment of FIG. 11 may alternatively be used to align two or more sensors within their respective camera bodies, by altering the position and/or alignment of at least one sensor in its respective camera body.

In the embodiments described above, the alignment of a sensor is established from the position of the maxima of the diffraction pattern produced by the sensor. In order to correctly align the sensor, therefore, it is necessary to adjust the position and/or orientation of the sensor until the intensity of the diffraction pattern at a pre-determined point (corresponding to the expected position of a diffraction maximum) reaches a maximum. This can be difficult to do by eye, and the provision of detectors such as the detectors 35, 36, 37 of FIG. 11 is therefore preferable since this allows more accurate alignment of the sensors.

Figure 12:
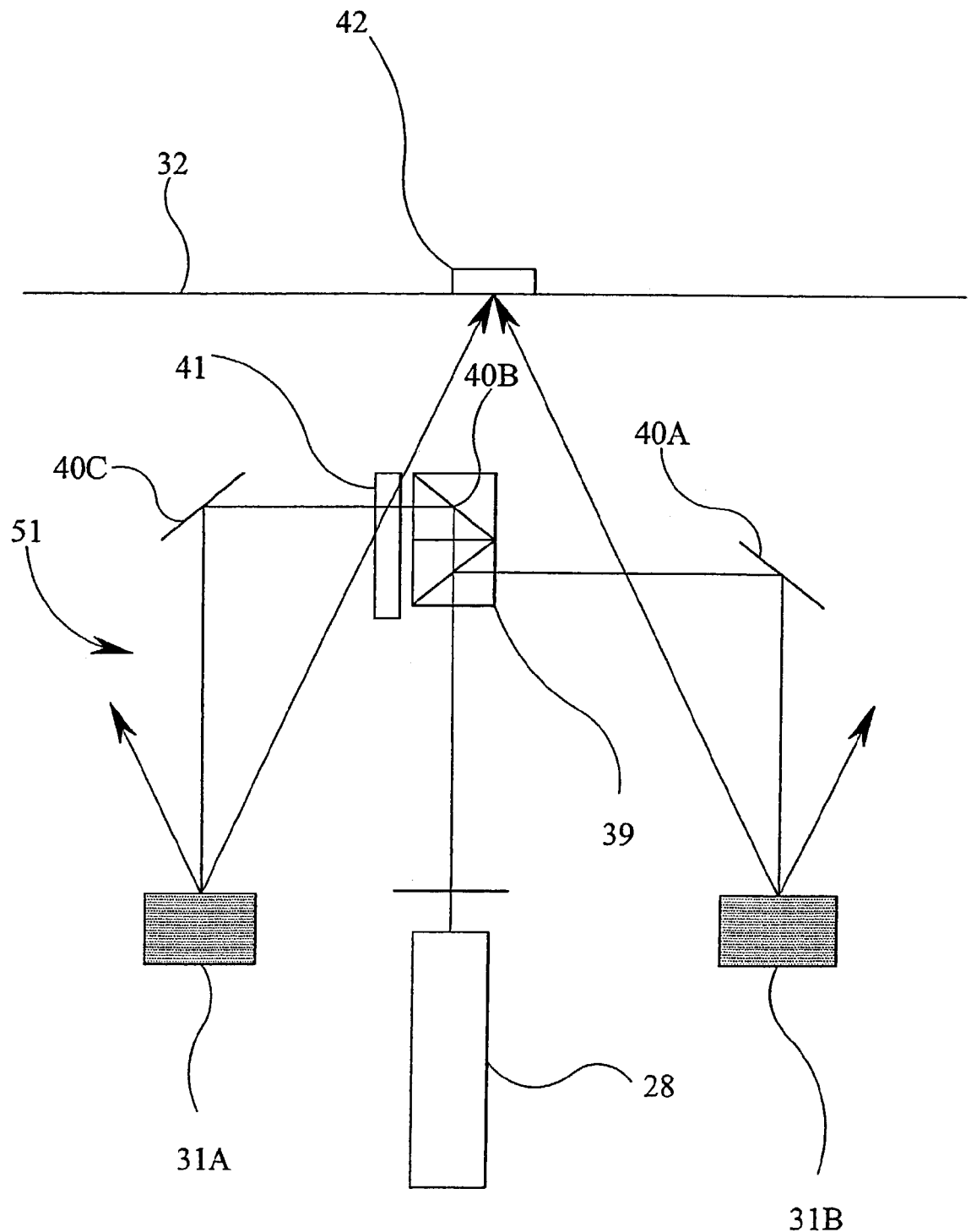
FIG. 12 illustrates an apparatus according to a third embodiment of the present invention.

FIG. 12 illustrates an apparatus 51 according to a further embodiment of the present invention, in which it is arranged that the two diffraction patterns produced by a pair of sensors are out of phase with one another. When the sensors are correctly aligned relative to one another, therefore, the two diffraction patterns should cancel one another out, and this makes it easier to establish the correct alignment of the sensors by eye.

The embodiment of FIG. 12 requires a source 28 such as a laser that emits a beam of coherent light. The two beams that are incident on the two sensors 31A, 31B to be aligned are derived from a single beam of light emitted by the coherent light source, using a beam splitter arrangement. The optical system for splitting the beam and directing the two split beams onto a respective sensor is such that the light path from the laser to one sensor has an optical path difference of a half wavelength (or an odd number of half wavelengths) from the path length between the laser and the other sensor. As a result, the diffraction patterns produced by the two sensors are exactly out of phase with one another, and so will cancel out when the two diffraction patterns are superimposed on a capture device 32 such as a screen.

In the embodiment of FIG. 12, the laser beam emitted by the laser 28 passes through a polariser 38 arranged so that the output beam from the polariser 38 is plane-polarised at 45°. The polarised beam of light is then incident on a polarising beam splitter 39 that splits the incident light beam into two beams of approximately equal intensity. One beam is reflected through 90° by the polarising beam splitter 39 and, after reflection at a mirror 40A is incident on one of the sensors 31B to be aligned. The other beam is transmitted through the polarising beam splitter 39 without deviation, and is then reflected by two mirrors 40B, 40C to be incident on the other sensor 31A to be aligned. A compensation plate 41 is disposed in the light path between the polarising beam splitter and the sensor 31A, to ensure that there is a path difference between the two beams is equal to $(n-\frac{1}{2})\lambda$, where $\lambda$ is the wavelength of light emitted by the light source 28 and n is a natural number (that is, n=1, 2, 3 . . . )

Since the light beams incident on the two sensors 31A, 31B are exactly out of phase with one another, the two resultant diffraction patterns will also be out of phase with one another. In the region where the two diffraction patterns overlap, they will interfere and cancel each other out. If the two sensors are correctly aligned relative to one another, there will be zero overall amplitude where the two diffraction patterns overlap. The sensors may be aligned relative to one another simply by adjusting the position and/or orientation of one or both is sensors until the two diffraction patterns exactly cancel one another out in the region of the screen where they overlap.

The embodiment of FIG. 12 may be used to align the two sensors by eye. In a preferred embodiment, however, the apparatus further comprises one or more null detectors 42 disposed in the region where the two diffraction patterns should overlap (only one null detector 42 is shown in FIG. 12, but the invention is not limited to a single null detector). The two sensors 31A, 31B may be aligned relative to one another by adjusting the position and/or orientation of one or both sensors until the null detector indicates that the overall amplitude of the interfering diffraction patterns is at a minimum. This allows the process to be automated, and also allows a laser that emits wavelengths outside the visible region of the spectrum to be used.

In the embodiment of FIG. 12 the sensors 31A . . . 31D are disposed within their camera bodies, and the camera bodies are mounted on a support in a similar manner to the embodiment of FIG. 9A. Where the embodiment of FIG. 12 is applied to aligning camera bodies in which a sensor has already been mounted and aligned, the apparatus preferably comprises means for adjusting the position and/or orientation of each camera body (for example relative to a support such as the support 29 of FIG. 9A), and preferably also comprises means for fixing the position and orientation of camera body. Alternatively, the embodiment of FIG. 12 may comprise means for adjusting the position and/or orientation of each sensor within its respective camera body, and may also comprise means for fixing the position and orientation of each sensor within its respective camera body. The camera bodies, support, adjusting means and fixing means are omitted from FIG. 12 for ease of description.

Figure 13:
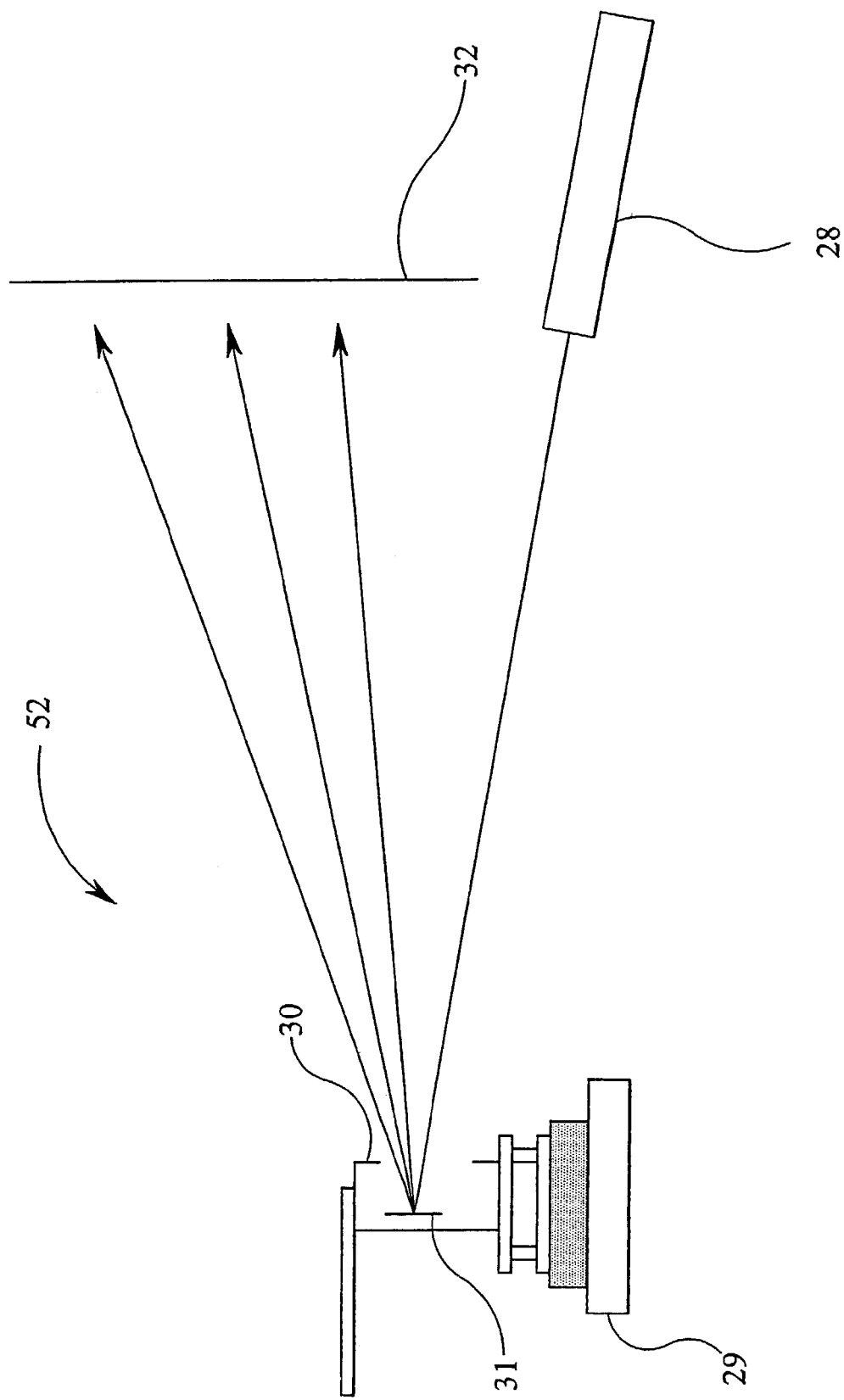
FIG. 13 illustrates an apparatus according to a fourth embodiment of the present invention.

FIG. 13 shows an apparatus according to a further embodiment of the present invention. The apparatus 52 of FIG. 13 is generally similar to the apparatus 27 shown in FIG. 9, and only the differences will be described here.

In the apparatus 27' shown in FIG. 13, the light source 28 is arranged such that the beam of light is not perpendicular to the sensor 31 when the sensor is correctly aligned relative to the support 29. The laser beam also need not be perpendicular to the sensor when the apparatus is viewed from above. The beam may be incident at any angle, and the diffraction pattern will be centred on the direction of the specularly reflected beam from the sensor 31.

In principle, the apparatus shown in FIG. 11 or 12 could also be embodied with light sources (FIG. 11) or a light source and optical system (FIG. 12) that produce beams of light that are not perpendicular to the sensors to be aligned.

Figure 14:
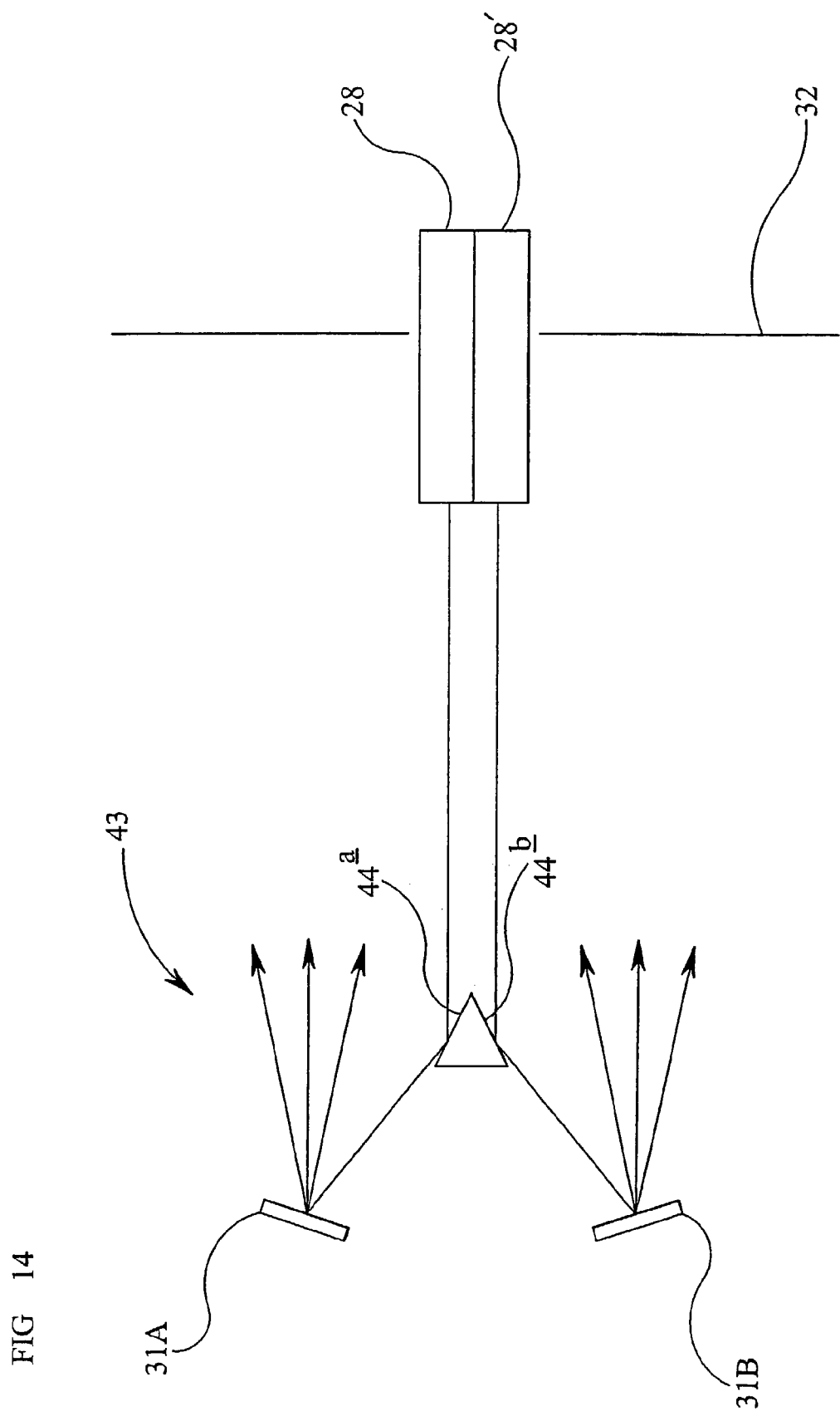
FIG. 14 illustrates an apparatus according to a fifth embodiment of the present invention.

FIG. 14 shows an apparatus 43 according to a further embodiment of the present invention. This embodiment is intended to align the CCD sensors in a stereoscopic camera pair in which the optic axis of the two cameras are converged rather than parallel.

The apparatus 43 of FIG. 14 comprises a first light source 28 that emits a first light beam, which is deflected by a first deflecting mirror 44a onto a first sensor 31A. The apparatus further comprises a second light source 28' that generates a second light beam, which is deflected by a second deflecting mirror 44b onto a second sensor 31B. In FIG. 14 the deflecting mirrors 44a, 44b are two faces of a reflective prism but this embodiment of the invention is not limited to this particular construction for the deflecting mirrors. The angle between the first and second deflecting mirrors depends on the angle of convergence required for the two sensors 31A, 31B—the angle between the deflecting mirrors should be such that, when the two sensors are correctly aligned, the specular reflection of the beam incident on each sensor is normal to the image capture device 32.

The alignment of each sensor 31A, 31B may be determined from the diffraction pattern that it projects onto the capture device, as described above, and the position and/or orientation of each sensor may be adjusted based on the observed diffraction pattern. The image capture device may consist of a screen, and is preferably provided with detectors or marks at positions where the diffraction pattern should have a maximum if the respective sensor is correctly aligned. Although the light source(s) is/are placed in the region where the two diffraction patterns might overlap in this embodiment it should be noted that the diffraction pattern is two-dimensional so that spots where two maxima are coincident may exist above and below the light source(s) (that is, into and out of the plane of the paper as seen in FIG. 14).

The apparatus described above with reference to other embodiments of the present invention may also be adapted to align a pair of sensors whose optical axis are converging. All that is necessary is for the capture device 32, and detectors if provided, to be re-positioned appropriately.

FIG. 14 shows the apparatus 43 as provided with two separate light sources 28, 28'. In an alternative embodiment, the two separate light sources may be replaced by a single light source and a beam splitter.

If the sensors are already aligned and mounted in respective camera bodies, the position and/or orientation of each sensor may be adjusted by altering the and the position and/or orientation of the respective camera body. Alternatively, the position and/or orientation of each sensor within its respective camera body may be adjusted. In the latter case, the embodiment of FIG. 14 preferably comprises means for adjusting the position and/or orientation of each sensor within its respective camera body, and preferably also comprises means for fixing the position and orientation of each sensor within its respective camera body. The camera bodies, support, adjusting means and fixing means are omitted from FIG. 14 for ease of description.

Figure 15:
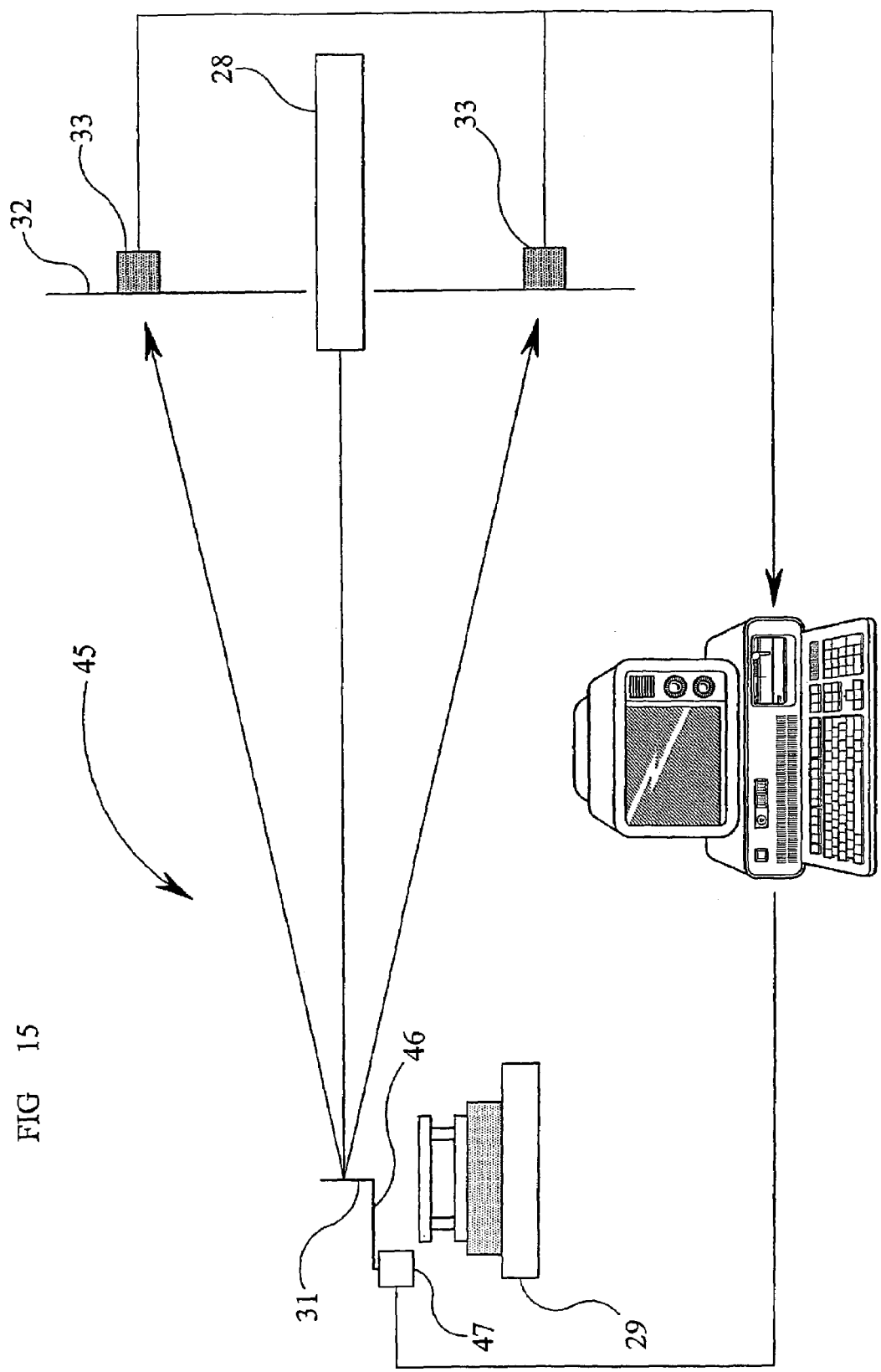
FIG. 15 illustrates an apparatus according to a sixth embodiment of the present invention.

FIG. 15 illustrates an apparatus 45 according to a further embodiment of the present invention. This embodiment illustrates how the present invention may be automated.

The apparatus shown in FIG. 15 corresponds generally to the embodiment of FIG. 9. In this embodiment, however, the camera body (not shown) to be aligned is supported on a mount 46 connected to a computer-controlled actuator 47. The sensor 31 is mounted inside the camera body, and has already been aligned within the camera body. The actuator 47 is controlled by a computer system 48. The input to the computer system 48 is the output from sensors 33 of the image capture device 32.

In the apparatus of FIG. 15, the sensors 33 of the image capture device will provide an initial output, and this will be indicative of the diffraction pattern produced by the CCD sensor 31 in its initial orientation. The output from the sensors is input to the computer 48, and this determines a suitable correction to the alignment of the CCD sensor 31 from the diffraction pattern as observed by the sensors. Once the computer has determined a suitable adjustment to the position/or orientation of the CCD sensor 31, it instructs the actuator 47 to move the support 46 to alter the position and/or orientation of the camera body—and thus alter the position and/or orientation of sensor 31—accordingly. The new alignment of the sensor 31 is then determined from the output from the sensor 33 produced by the new diffraction pattern, and the position and/or orientation of the camera body (and thus of the sensor 31) are further corrected if necessary. This process is repeated until the camera body is correctly aligned.

The apparatus 45 of FIG. 15 further comprises means (not shown in FIG. 15 for clarity) for fixing the camera body. When the sensor 31 is correctly aligned, the fixing means may be actuated to fix the camera body in its correct position and orientation relative to the support as described above with reference to the embodiment of FIG. 9.

The embodiment of FIG. 15 aligns a camera body, in which a sensor has already been mounted and aligned, relative to a support such as a support rail. A modification of the embodiment of FIG. 15 (not shown) enables a sensor to be aligned within a camera body. This embodiment corresponds generally to the embodiment of FIG. 15, except that the actuator is effective to vary the position and/or orientation of the sensor relative to the camera body.

The embodiments of FIGS. 11–14 may also be automated, by using the output from the sensors or detectors of the image capture device of these embodiments.

Figure 1:
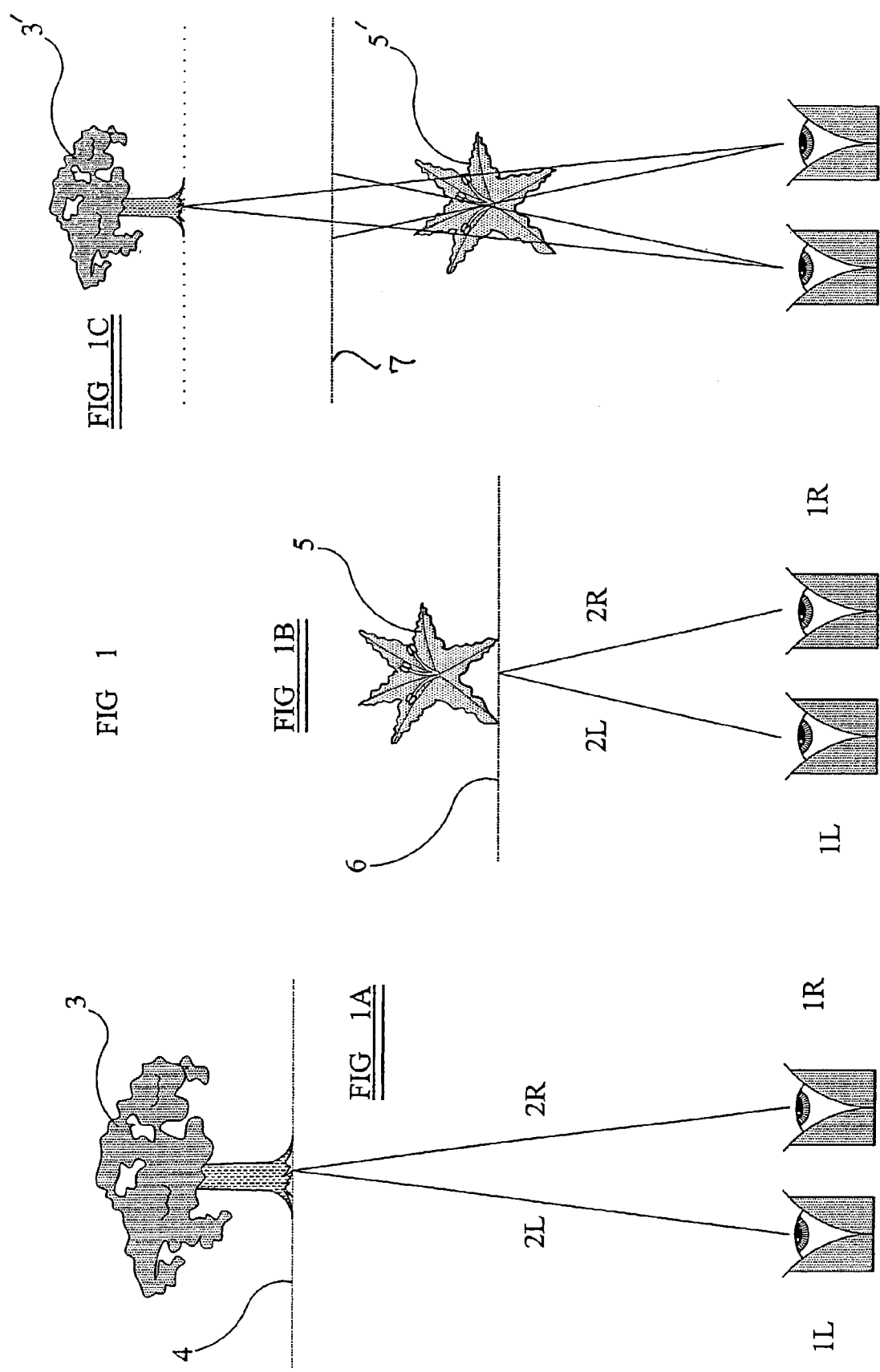
FIGS. 1A to 1C illustrate the principles of accommodation and convergence.
Figure 3C:
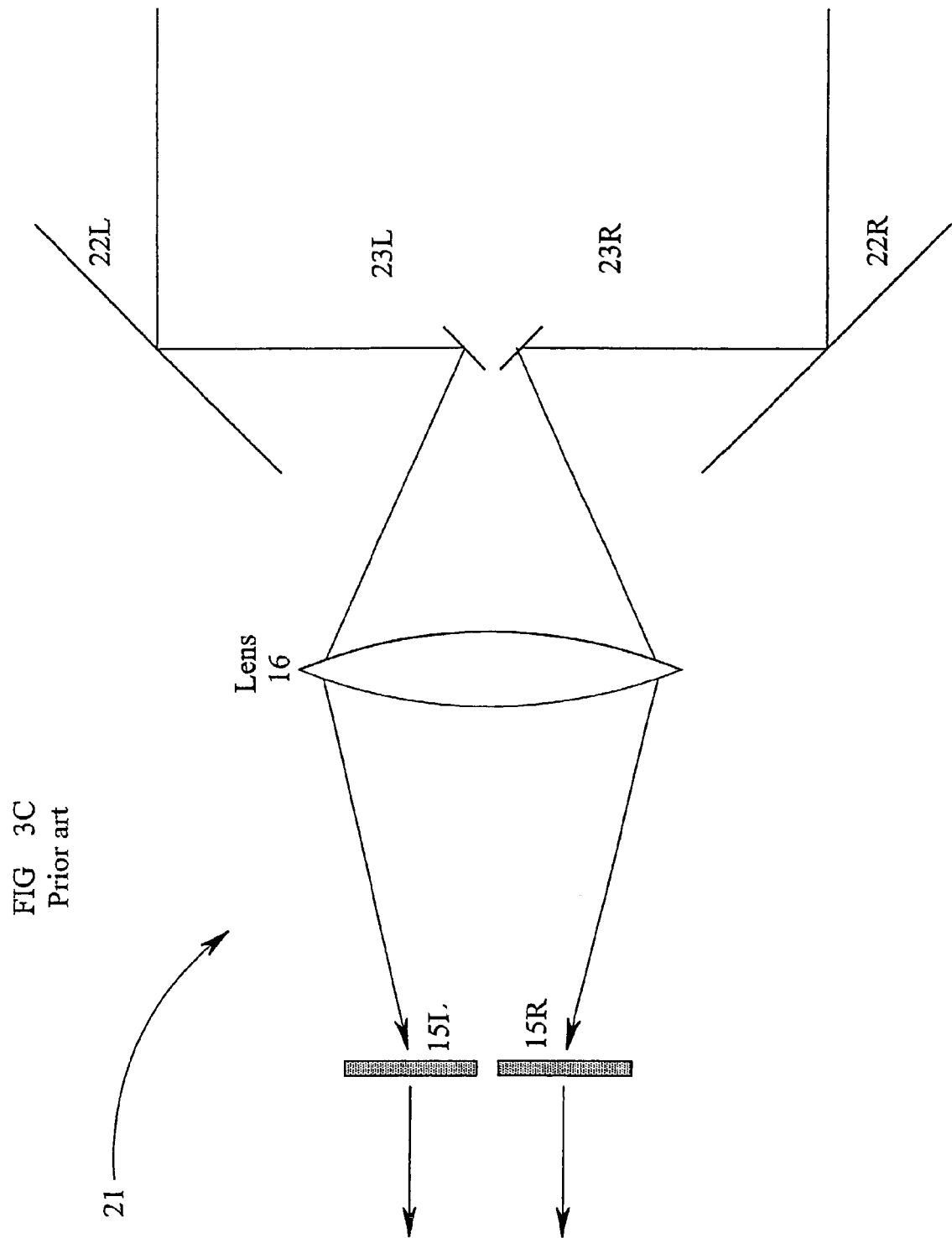
FIG. 3C illustrates a single lens, multi sensor stereoscopic camera system.
Figure 3D:
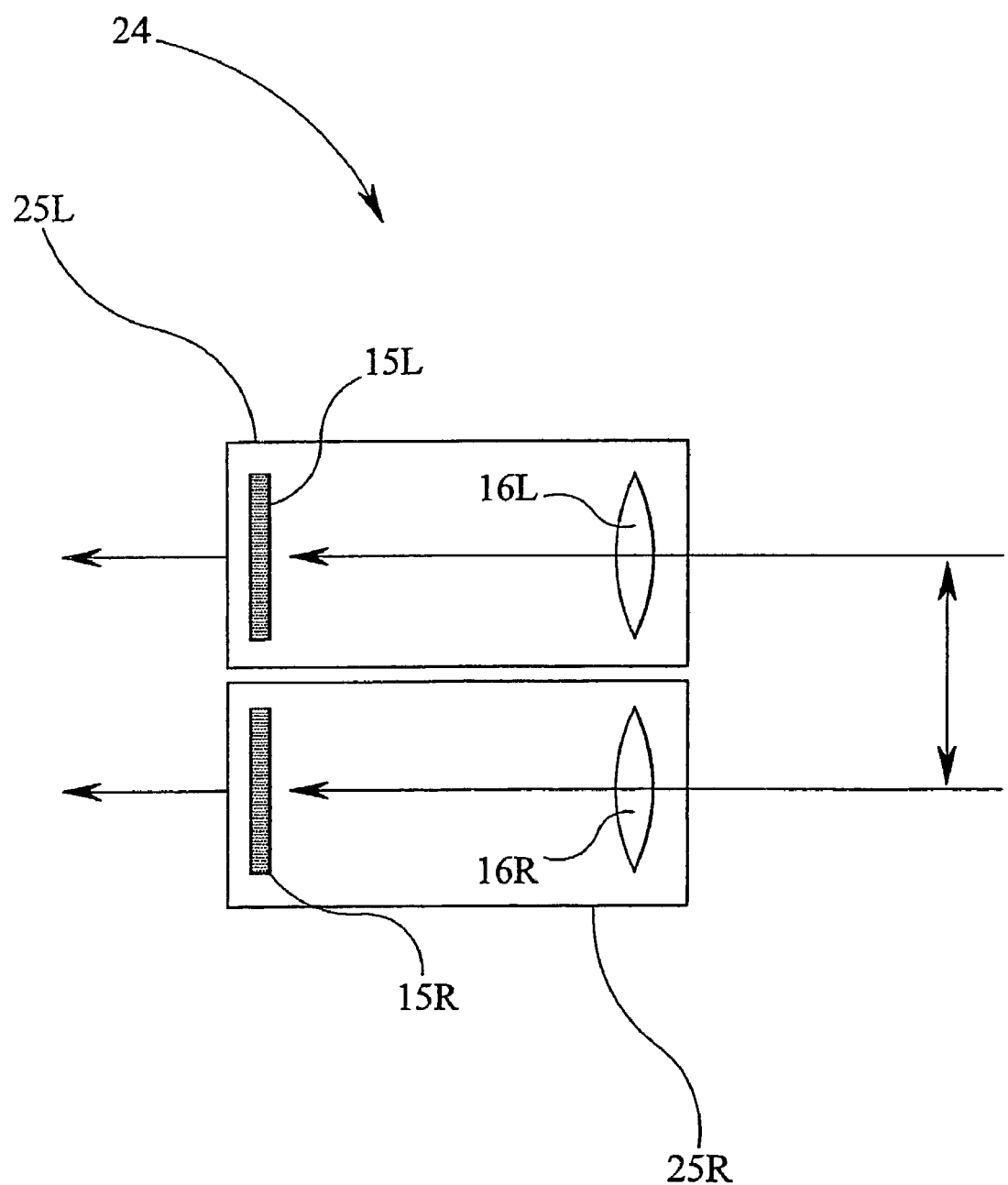
FIG. 3D illustrates a multi lens, multi-sensor stereoscopic camera system.
Figure 4:
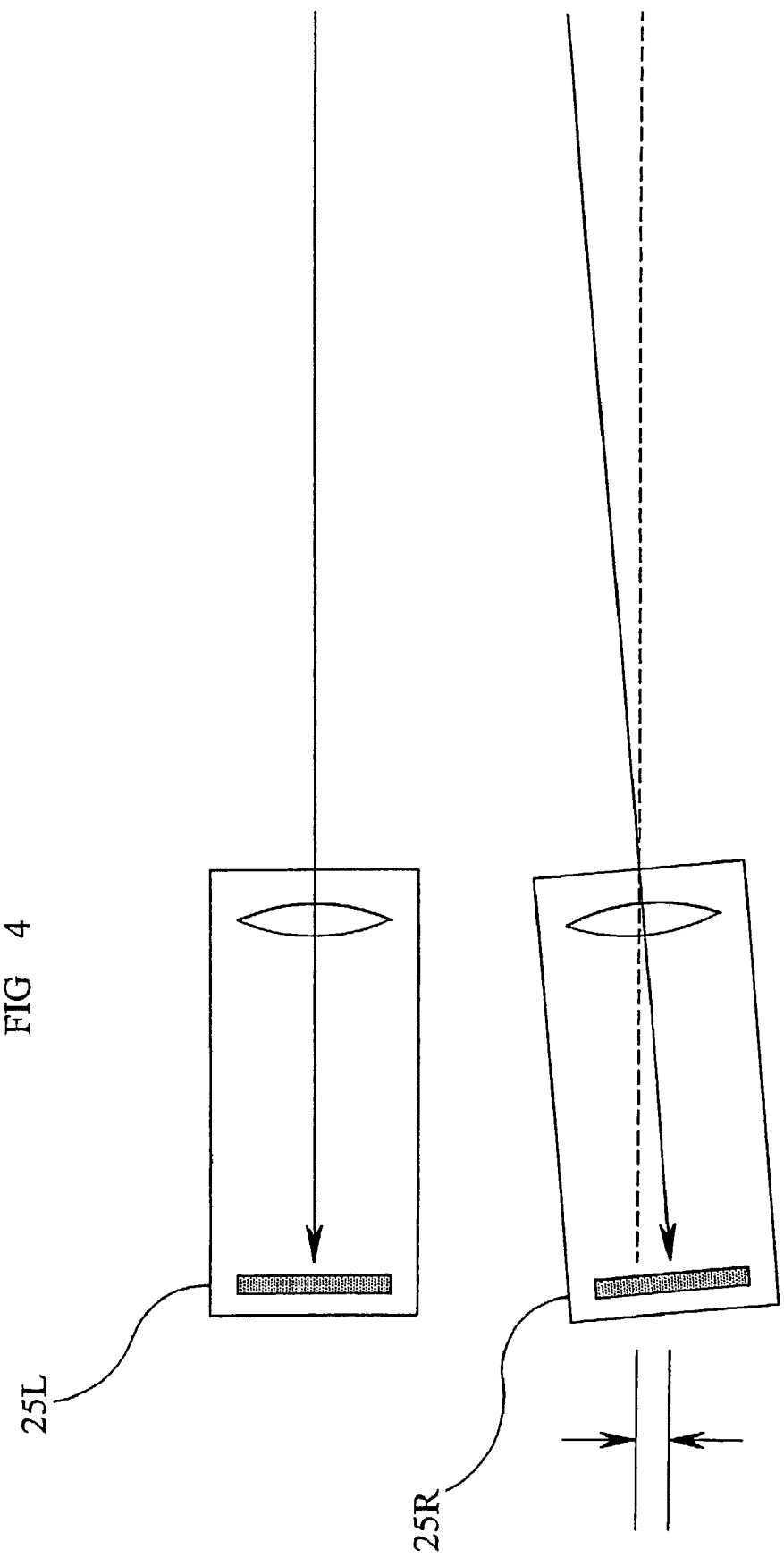
FIG. 4 illustrates a rotational alignment error in a stereoscopic camera pair.
Figures 7A, 7B:
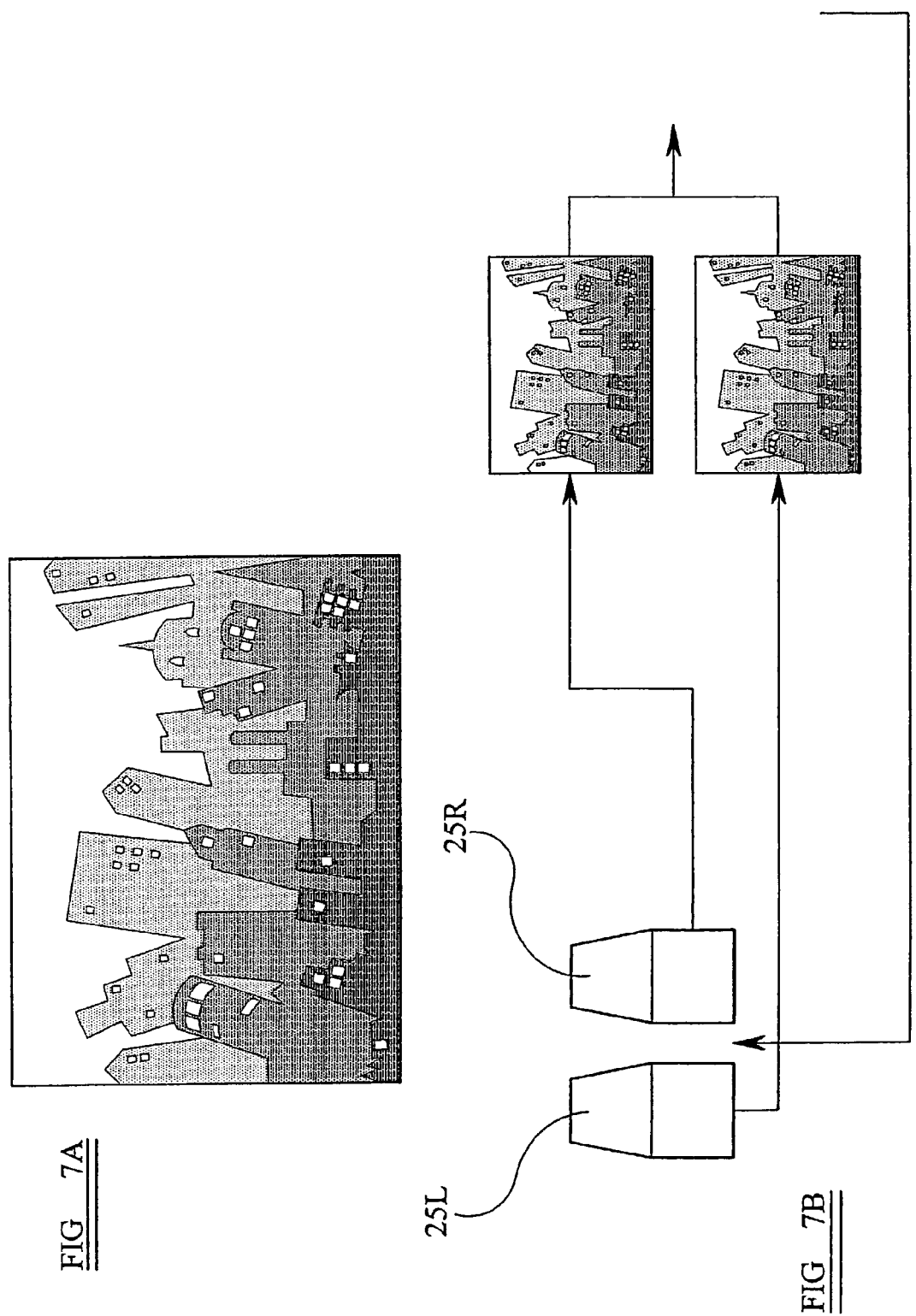
FIGS. 7A and 7B illustrate another prior art method of correcting alignment of a stereoscopic camera pair.
Figure 16:
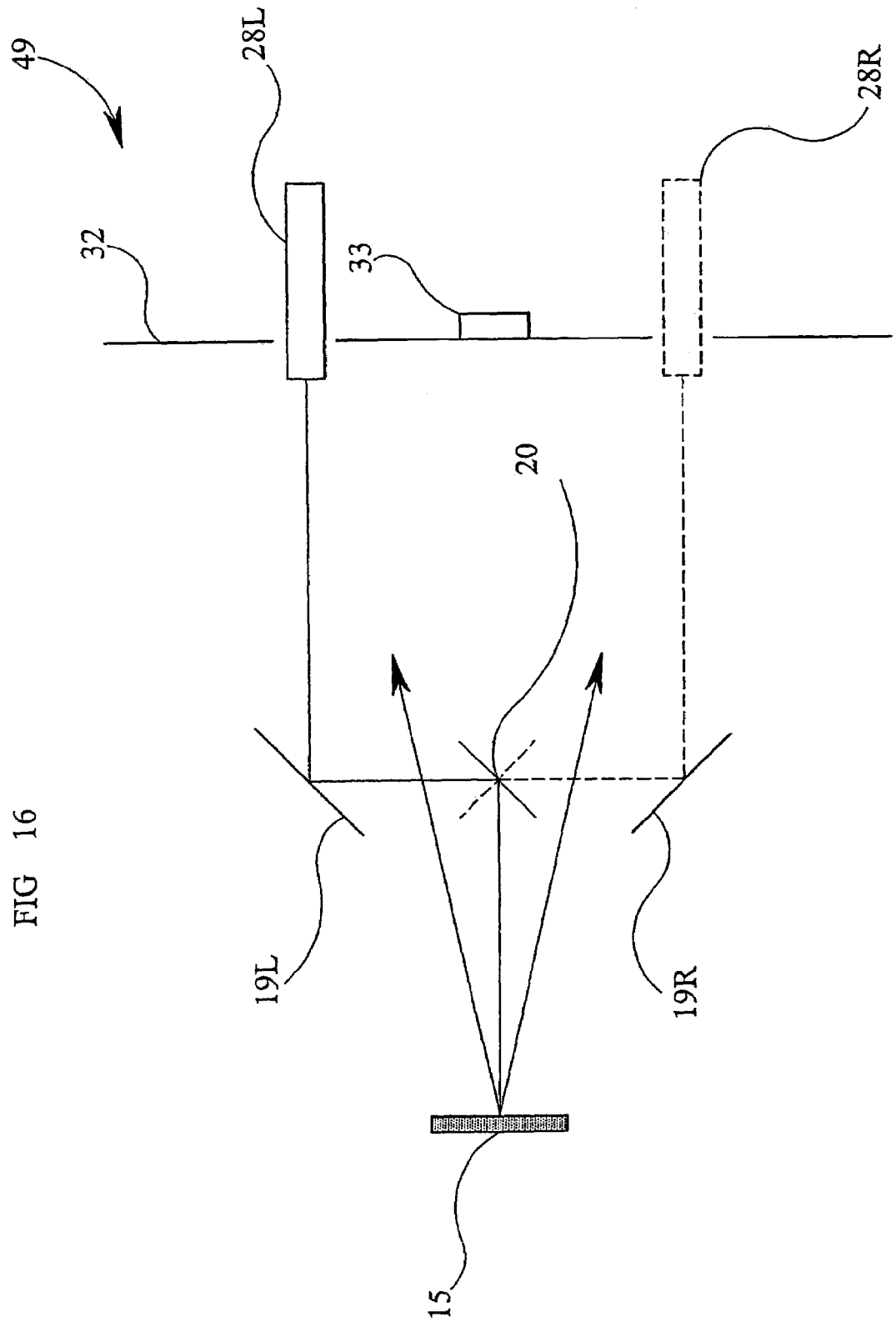
FIG. 16 illustrates an apparatus according to the seventh embodiment of the present invention.

The apparatus described above with reference to FIGS. 9 to 15 have been intended for aligning the sensors in a multi lens, multi sensor stereoscopic camera. The invention may also be applied, however, to aligning a multi-lens, single sensor system of the type shown schematically in FIG. 3B. FIG. 16 illustrates an apparatus 49 of the invention that is suitable for aligning the mirrors 19L, 19R in a multi-lens, single sensor stereoscopic camera of the type shown in FIG. 3B, relative to the sensor of the camera.

The apparatus 49 consists essentially of a pair of light sources 28L, 28R that generate two light beams that simulate the two views of the multi-lens single sensor stereoscopic camera system. The light beams produced by the light sources 28L, 28R are input into the stereoscopic camera which has the sensor 15 mounted in the camera body but with the lenses 16L, 16R of FIG. 3B absent. The sensor 15 will generate a diffraction pattern, from the light beam that is not blocked by the switchable mirror 20. With the switchable mirror in the position shown in a full line in FIG. 16, the diffraction pattern will be generated from the light beam from the laser 28L, and so will depend on the alignment of the mirror 19L. Thus, with the switchable mirror 20 in the position shown in full in FIG. 16, the alignment of the mirror 19L may be established from the diffraction pattern captured by the capture device 32, and the alignment of the mirror 19L may be adjusted as necessary.

Once the mirror 19L has been correctly aligned, the switchable mirror 20 can be moved into the position shown in broken lines in FIG. 16. The sensor 15 will then generate a diffraction pattern from the light beam from the light source 28R, and this diffraction pattern will depend on the alignment of the mirror 19R. The alignment of the mirror 19R may be established from this diffraction pattern, and the alignment of mirror 19R may be adjusted as necessary. Thus, the apparatus according to this embodiment of the invention enables the mirrors 19L, 19R to be aligned relative to the optic axis of the CCD sensor 15. The apparatus 49 may further comprise means for fixing the alignment of one or both of the mirrors 19L, 19R relative to the camera body (not shown in FIG. 16) once the mirrors have been correctly aligned.

The sensor 15 of the camera of FIG. 16 may initially be aligned within the camera body (not shown) by a method as described above, for example by a method as described with reference to FIG. 9. Although the alignment of the mirrors 19L, 19R relative to the sensor 15 is usually more critical than the alignment of the sensor in a stereoscopic camera of this type, it may be necessary to align the sensor with respect to the camera body as an initial step so that the reflected diffraction pattern is in the correct position for the step of aligning the mirrors.

The image capture device 49 may, as for other embodiments, consist of a screen 32 if the light sources 28L, 28R emit visible light. As described above, the image capture device may be provided with one or more detectors 33, for example to improve accuracy of the alignment process, to enable the apparatus to be automated, or to enable light sources that emit radiation outside the visible spectrum to be used. If detectors 33 are provided, it is preferred that they are placed generally along an axis that is perpendicular to the axis in which the two light sources 28L, 28R are provided (that is, out of the plane of the paper in FIG. 16). If the detectors were placed along the axis in which the light sources are provided, there is the risk that the mirrors 19L, 19R would block some of the diffraction pattern and so make the alignment process less reliable.

FIG. 16 shows two separate light sources 28L, 28R. The embodiment of FIG. 16 could alternatively be embodied using a single light source and a beam splitter to generate light beams incident on each mirror 19L, 19R. The embodiment of FIG. 16 could in principle also be embodied using a single light source that can be moved between a position in which it serves as one of the light sources 28L, 28R of FIG. 16 and another position in which it serves as the other of the light sources 28L, 28R of FIG. 16.

As explained with reference to the embodiment of FIG. 9 above, it is not possible to determine whether the sensor is correctly aligned in the x- and y-directions, since the diffraction pattern is independent of the point in which the laser beam is incident on the sensor. In the embodiments of FIGS. 9 to 15, it can be determined whether the or each sensor is correctly aligned in the x- and y-directions by observing the point at which a light beam is incident on a sensor. In the embodiment of FIG. 16, it is more difficult to determine whether the mirrors are correctly aligned in the x- and y-directions, but this a relatively minor disadvantage, however, since the alignment of the mirrors 19L, 19R along the x- and y- does not affect the three-dimensional optical performance of the camera system, but only affects the useable field of view of the camera system.

The present invention provides an apparatus that may align the sensor(s), or the mirrors in the embodiment of FIG. 16, relative to the camera body. In each embodiment, the apparatus aligns the sensor/mirrors with the camera lenses removed. Once the sensors/mirrors have been aligned, the lenses may be fitted to the camera body and aligned using any suitable prior art technique. In particular, the lens alignment may be carried out using the method described with reference to FIGS. 8A and 8B above. That is, the camera, without lens, is set up so that the light beam is incident on the centre of the CCD sensor, and the lens is then fitted in position. The change in position of the light beam on the sensor when the lens is fitted forms the basis of a simple correction to the image pair, by shifting one image relative to the other image without interpolating pixels (and so without reducing image quality). Any overhanging areas of either image can be cropped, to produce a fully aligned three-dimensional image.

The preferred embodiments of the invention have been described with reference to aligning an optical component. However, the invention is in principle not limited to aligning an optical component but may be applied to aligning any structure that produces a diffraction pattern. Furthermore the invention is not limited to use with a structure that is diffractive over its entire area (or over the entire area of one face), but may be used with any structure that has a diffractive portion. The invention maybe applied to a structure that is not primarily a diffractive structure, provided that the structure has an area that is diffractive. As an example, the invention may be applied to a mirror that has a small diffractive area—the diffractive area may be used to align the mirror, even if the diffractive area is not used subsequently during normal operation of the system containing the mirror.

In the embodiments described above the diffraction pattern is produced in reflection. In principle, however, the invention is not limited to a diffraction pattern produced in reflection.

What is claimed is:

1. A method of determining the orientation and/or position of a structure, the method comprising the steps of:
   directing a light beam having a pre-determined orientation at a first structure;
   capturing a first diffraction pattern produced by the first structure;
   adjusting the orientation and/or position of the first structure from information derived from the first diffraction pattern;
   fixing the position and orientation of the first structure relative to a support thereby to mount the first structure on the support;
   moving the support with respect to the light beam; and
   mounting a second structure on the support.

2. A method as claimed in claim 1 wherein the step of mounting the second structure on the support comprises:
   positioning the second structure in the optical path of the light beam;
   capturing a second diffraction pattern produced by the second structure;
   adjusting the orientation and/or position of the second structure from information derived from the second diffraction pattern; and
   fixing the position and orientation of the second structure relative to the support thereby to mount the second structure on the support.

3. A method as claimed in claim 1 wherein the step of moving the support with respect to the light beam comprises moving the support in a direction substantially perpendicular to the optical path of the light beam.

* * * * *